United States Patent
Tamaru

(10) Patent No.: US 8,023,000 B2
(45) Date of Patent: Sep. 20, 2011

(54) IMAGE PICKUP APPARATUS, IMAGE PROCESSING APPARATUS, IMAGE PICKUP METHOD, AND IMAGE PROCESSING METHOD

(75) Inventor: Masaya Tamaru, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 576 days.

(21) Appl. No.: 12/104,743

(22) Filed: Apr. 17, 2008

(65) Prior Publication Data
US 2008/0259176 A1    Oct. 23, 2008

(30) Foreign Application Priority Data

Apr. 20, 2007  (JP) ................. 2007-112146

(51) Int. Cl.
*H04N 5/228* (2006.01)
(52) U.S. Cl. .............. 348/222.1; 348/239; 382/255
(58) Field of Classification Search ............ None
See application file for complete search history.

(56) References Cited

U.S. PATENT DOCUMENTS

| | | | |
|---|---|---|---|
| 7,046,279 B2 | 5/2006 | Yamanaka et al. | |
| 2002/0080261 A1* | 6/2002 | Kitamura et al. | 348/349 |
| 2002/0140823 A1* | 10/2002 | Sakurai et al. | 348/207.99 |
| 2003/0151679 A1* | 8/2003 | Amerson et al. | 348/231.6 |
| 2004/0080661 A1* | 4/2004 | Afsenius et al. | 348/345 |
| 2006/0198623 A1* | 9/2006 | Ono | 396/89 |
| 2008/0101728 A1* | 5/2008 | Vitsnudel et al. | 382/317 |

FOREIGN PATENT DOCUMENTS

| | | | |
|---|---|---|---|
| JP | 09261526 A | * | 10/1997 |
| JP | 10-290389 A | | 10/1998 |
| JP | 11-317905 A | | 11/1999 |
| JP | 2001-223874 A | | 8/2001 |
| JP | 2001-298657 A | | 10/2001 |
| JP | 2002010126 A | * | 1/2002 |
| JP | 2002-084412 A | | 3/2002 |
| JP | 2002-084444 A | | 3/2002 |
| JP | 2002-094860 A | | 3/2002 |
| JP | 2003-288589 A | | 10/2003 |
| JP | 2003283902 A | * | 10/2003 |
| JP | 2004-289383 A | | 10/2004 |
| JP | 2005039680 A | * | 2/2005 |
| JP | 2005-204185 A | | 7/2005 |
| JP | 2007-006044 A | | 1/2007 |

(Continued)

OTHER PUBLICATIONS

Naito et al., "Enhanced Image Acquisition by Using Multiple Differently Focused Images," Transactions of the Institute of Electronics, Information and Communication Engineers D-II, vol. 79-D-II, No. 6, pp. 1046-1053, Jun. 1996.*

(Continued)

*Primary Examiner* — Lin Ye
*Assistant Examiner* — Dennis Hogue
(74) *Attorney, Agent, or Firm* — Sughrue Mion, PLLC

(57) ABSTRACT

The present invention, which transforms multiple images so that positions of corresponding points will coincide between the images and composites the images with the corresponding points matched, provides an image pickup apparatus, image processing apparatus, image pickup method, and image processing method which make it possible to obtain an intended all-in-focus image or blur-emphasized image even if there is camera shake or subject movement.

15 Claims, 16 Drawing Sheets

FOREIGN PATENT DOCUMENTS

| JP | 2007-020087 A | 1/2007 |
|---|---|---|
| JP | 2007-074243 A | 3/2007 |

OTHER PUBLICATIONS

JP Notice of Reasons for Rejection, dated Aug. 6, 2010, issued in corresponding JP Application No. 2007-112146, 6 pages English and Japanese.

Report on Prior Art Search done for corresponding Japanese Application No. 2007-112146, 4 pages in English and Japanese.

Explanation of circumstances concerning accelerated examination, dated Apr. 8, 2010, filed in corresponding JP Application No. 2007-112146, 20 pages in English and Japanese.

JP Notice of Reasons for Rejection, dated May 19, 2010, issued in corresponding JP Application No. 2007-112146, 7 pages in English and Japanese.

\* cited by examiner

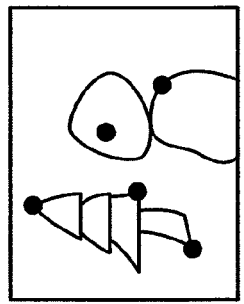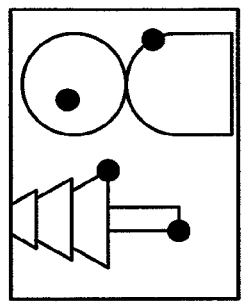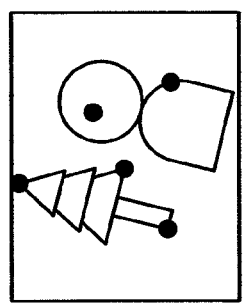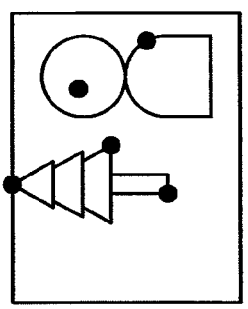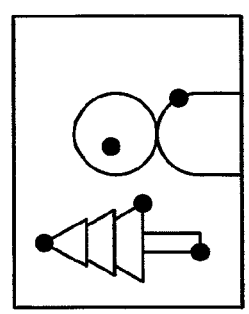

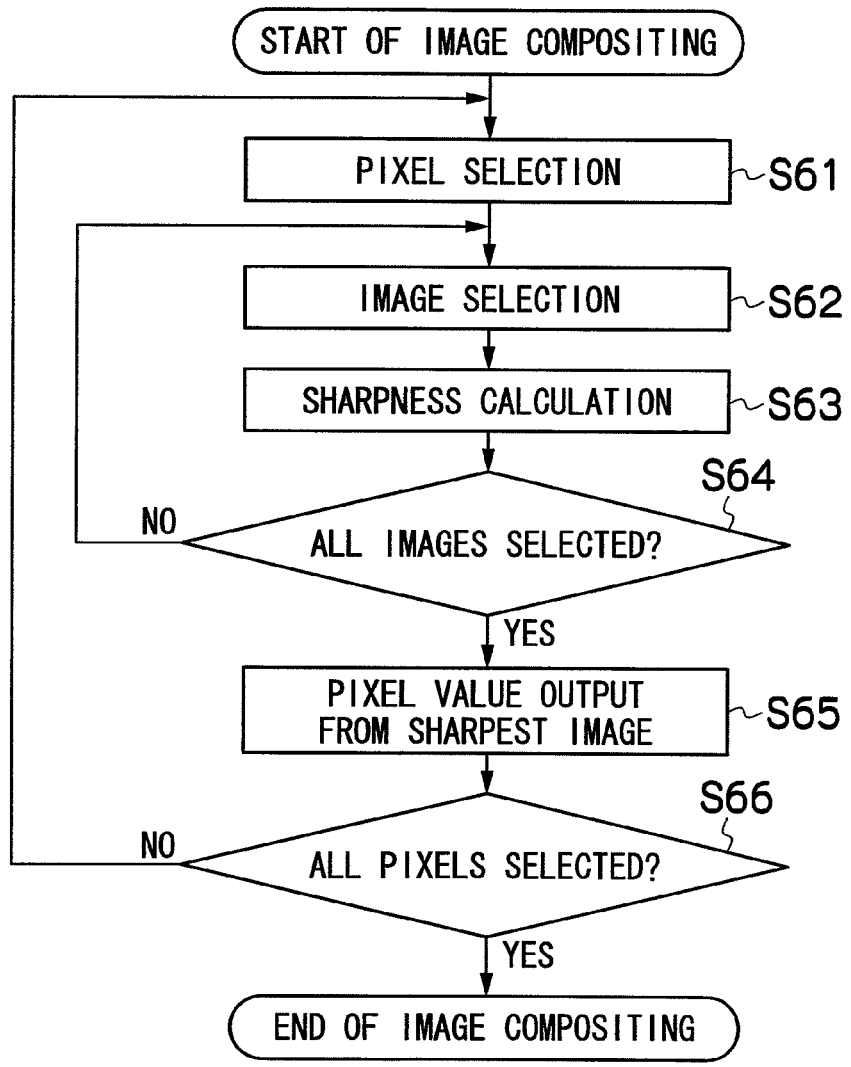

IMAGE PICKUP APPARATUS, IMAGE PROCESSING APPARATUS, IMAGE PICKUP METHOD, AND IMAGE PROCESSING METHOD

BACKGROUND OF THE INVENTION

1. Field of the Invention

The present invention relates to an image pickup apparatus, image processing apparatus, image pickup method, and image processing method, and more particularly to an image pickup apparatus, image processing apparatus, image pickup method, and image processing method which obtain an all-in-focus image or blur-emphasized image by compositing multiple images with different focus positions.

2. Description of the Related Art

Conventionally, an all-in-focus image in which the entire image is in focus or an image with a controlled blur has been obtained by compositing multiple images shot by focus bracketing which involves taking successive shots by changing a focus position. However, the compositing process has a problem in that any camera shake or subject movement during the successive shooting will reduce correlation among the images used for the process, making it impossible to obtain an intended image.

Japanese Patent Application Laid-Open No. 2002-84444 discloses an image pickup apparatus which can obtain images under shooting conditions suitable for a compositing process by switching to shooting conditions different from those in normal shooting mode when creating an image with a controlled blur by compositing multiple images of different focal lengths. When shooting in focus-bracketing mode, the image pickup apparatus can minimize camera shake and subject movement using shooting conditions provided by a combination of a minimum exposure time of an image pickup element and such an f-stop number that will minimize the exposure time.

SUMMARY OF THE INVENTION

However, even if the exposure time is minimized as in the case of the image pickup apparatus disclosed in Japanese Patent Application Laid-Open No. 2002-84444, there remains a possibility of camera shake and subject movement, making it impossible to obtain an intended image. The present invention has been made in view of the above circumstances and has an object to provide an image pickup apparatus, image processing apparatus, image pickup method, and image processing method which make it possible to obtain an intended all-in-focus image or blur-emphasized image even if there is camera shake or subject movement.

To achieve the above object, the present invention provides an image pickup apparatus, comprising: a focus bracketing device which shoots images successively by discretely moving a focus position by a predetermined amount of movement and thereby obtains a plurality of images; a corresponding point detecting device which detects corresponding points on subjects among the plurality of images shot by the focus bracketing device; an image transformation device which transforms the plurality of images excluding one reference image so that positions of the corresponding points will coincide between the reference image and the plurality of images excluding the reference image, the reference image being selected from the plurality of images based on a predetermined criterion; an image compositing device which composites the plurality of images including the transformed images; and a recording device which records an image obtained by the image compositing device on a recording medium.

This makes it possible to obtain an all-in-focus image even if there is camera shake or subject movement.

In the image pickup apparatus, preferably the image compositing device composites the images using a weighted average in such a way as to assign larger weights to sharper pixels among pixels at corresponding coordinates in the plurality of images including the transformed images.

This makes it possible to obtain an intended all-in-focus image.

To achieve the above object, the present invention provides an image pickup apparatus, comprising: an automatic focusing device which determines an in-focus position of a main subject based on image data; a focus bracketing device which shoots images successively by discretely moving a focus position by a predetermined amount of movement and thereby obtains a plurality of images; a focus position control device which performs control such that the moving focus position will include focus positions at and around the in-focus position of the main subject determined by the automatic focusing device; a corresponding point detecting device which detects corresponding points on subjects among the plurality of images shot by the focus bracketing device including an image shot at the in-focus position of the main subject and images shot at the focus positions around the in-focus position of the main subject; an image transformation device which transforms the plurality of images excluding a reference image so that positions of the corresponding points will coincide between the reference image and the plurality of images excluding the reference image using the image shot at the in-focus position of the main subject as the reference image; an image compositing device which composites the plurality of images including the transformed images; and a recording device which records an image obtained by the image compositing device on a recording medium.

This makes it possible to obtain a blur-emphasized image even if there is camera shake or subject movement.

In the image pickup apparatus, preferably among pixels at corresponding coordinates in the plurality of images including the transformed images, if the sharpest pixel is contained in the image shot at the in-focus position of the main subject, the image compositing device composites the images by selecting the sharpest pixel, or if the sharpest pixel is contained in an image shot at a focus position other than the in-focus position of the main subject, the image compositing device composites the images by selecting a pixel contained in an image shot at a focus position symmetrical, with respect to the in-focus position of the main subject, to the focus position which provides the image containing the sharpest pixel.

This makes it possible to obtain an intended blur-emphasized image.

To achieve the above object, the present invention provides an image pickup apparatus, comprising: an automatic focusing device which determines an in-focus position of a main subject based on image data; a focus bracketing device which shoots images successively by discretely moving a focus position by a predetermined amount of movement and thereby obtains a plurality of images; a focus position control device which performs control such that the moving focus position will include focus positions at and around the in-focus position of the main subject determined by the automatic focusing device; a corresponding point detecting device which detects corresponding points on subjects among the plurality of images; an image transformation device which transforms the plurality of images excluding a reference image so that positions of the corresponding points will coincide between the reference image and the plurality of images excluding the reference image using the image shot at the in-focus position of the main subject as the reference image; a blur calculating device which calculates blur amounts in the plurality of images including the transformed images according to coordinates of pixels; a filtering device which determines a filter characteristics based on calculation results produced by the blur calculating device and applies digital filtering to the reference image shot at the in-focus position of the main subject; and a recording device which records an image obtained by the filtering device on a recording medium.

This makes it possible to obtain a blur-emphasized image even if there is camera shake or subject movement. Also, since the image has its blur emphasized using only the reference image, it is possible to vary the blurring smoothly, and thereby obtain a more naturally blurred image.

Preferably, the image pickup apparatus, according to claim 5, further comprising a sharpness calculating device which calculates sharpness of pixels at corresponding coordinates in the plurality of images, wherein the blur calculating device calculates the blur amounts in such a way as to increase the blur amounts with increasing difference in focus position between the sharpest image and the reference image.

This makes it possible to blur a desired area by an appropriate amount of blurring and thereby obtain an intended blur-emphasized image.

In the image pickup apparatus, preferably the image transformation device transforms images using at least one of translation, scaling-up, scaling-down, rotation, and warping of the images.

This makes it possible to appropriately transform the image.

In the image pickup apparatus, preferably the focus bracketing device decreases the predetermined amount of movement when depth of field is shallow and increases the predetermined amount of movement when the depth of field is deep, the depth of field depending on shooting conditions.

This makes it possible to obtain an intended blur-emphasized image using an appropriate number of shots.

In the image pickup apparatus, preferably the corresponding point detecting device detects the corresponding points as positions of the corresponding points change radially from a screen center or toward the screen center along with movements of the focus position.

This makes it possible to improve performance in detecting the corresponding points.

To achieve the above object, the present invention provides an image processing apparatus, comprising: an input device which allows inputs of a plurality of images of a same scene shot at different focus positions; a corresponding point detecting device which detects corresponding points on subjects among the plurality of images; an image transformation device which transforms the plurality of images excluding one reference image so that positions of the corresponding points will coincide between the reference image and the plurality of images excluding the reference image, the reference image being selected from the plurality of images based on a predetermined criterion; an image compositing device which composites the plurality of images including the transformed images; and an output device which outputs an image obtained by the image compositing device.

This makes it possible to obtain an all-in-focus image from images of the same scene even if there is camera shake or subject movement.

To achieve the above object, the present invention provides an image processing apparatus, comprising: an input device which allows inputs of a plurality of images of a same scene shot at different focus positions including an in-focus position of the main subject and focus positions around the in-focus position of the main subject; a corresponding point detecting device which detects corresponding points on subjects among the plurality of images; an image transformation device which transforms the plurality of images excluding a reference image so that positions of the corresponding points will coincide between the reference image and the plurality of images excluding the reference image using the image shot at the in-focus position of the main subject as the reference image; an image compositing device which composites the plurality of images including the transformed images; and an output device which outputs an image obtained by the image compositing device.

This makes it possible to obtain a blur-emphasized image from images of the same scene even if there is camera shake or subject movement.

To achieve the above object, the present invention provides an image processing apparatus, comprising: an input device which allows inputs of a plurality of images of a same scene shot at different focus positions including an in-focus position of the main subject and focus positions around the in-focus position of the main subject; a corresponding point detecting device which detects corresponding points on subjects among the plurality of images; an image transformation device which transforms the plurality of images excluding a reference image so that positions of the corresponding points will coincide between the reference image and the plurality of images excluding the reference image using the image shot at the in-focus position of the main subject as the reference image; a blur calculating device which calculates blur amounts in the plurality of images including the transformed images according to coordinates of pixels; a filtering device which determines a filter characteristics based on calculation results produced by the blur calculating device and applies digital filtering to the reference image shot at the in-focus position of the main subject; and an output device which outputs an image obtained by the filtering device.

This makes it possible to obtain a blur-emphasized image from images of the same scene even if there is camera shake or subject movement. Also, since the image has its blur emphasized using only the reference image, it is possible to vary the blurring smoothly, and thereby obtain a more naturally blurred image.

To achieve the above object, the present invention provides an image pickup method, comprising: a focus bracketing step of shooting images successively by discretely moving a focus position by a predetermined amount of movement and thereby obtaining a plurality of images; a corresponding point detecting step of detecting corresponding points on subjects among the plurality of images; an image transformation step of transforming the plurality of images excluding one reference image so that positions of the corresponding points will coincide between the reference image and the plurality of images excluding the reference image, the reference image being selected from the plurality of images based on a predetermined criterion; an image compositing step of compositing a plurality of images including the transformed images; and a recording step of recording an image obtained by the image compositing step on a recording medium.

This makes it possible to obtain an all-in-focus image even if there is camera shake or subject movement.

To achieve the above object, the present invention provides an image pickup method, comprising: an automatic focusing step of determining an in-focus position of a main subject; a focus bracketing step of shooting images successively by discretely moving a focus position by a predetermined amount of movement and thereby obtaining a plurality of images; a focus position control step of performing control such that the moving focus position will include focus positions at and around the in-focus position of the main subject determined by the automatic focusing step; a corresponding point detecting step of detecting corresponding points on subjects among the plurality of images shot by the focus bracketing step including an image shot at the in-focus position of the main subject and images shot at the focus positions around the in-focus position of the main subject; an image transformation step of transforming the plurality of images excluding a reference image so that positions of the corresponding points will coincide between the reference image and the plurality of images excluding the reference image using the image shot at the in-focus position of the main subject as the reference image; an image compositing step of compositing a plurality of images including the transformed images; and a recording step of recording an image obtained by the image compositing step on a recording medium.

This makes it possible to obtain a blur-emphasized image from images of the same scene even if there is camera shake or subject movement.

To achieve the above object, the present invention provides an image pickup method, comprising: an automatic focusing step of determining an in-focus position of a main subject; a focus bracketing step of shooting images successively by discretely moving a focus position by a predetermined amount of movement and thereby obtaining a plurality of images; a focus position control step of performing control such that the moving focus position will include focus positions at and around the in-focus position of the main subject determined by the automatic focusing step; a corresponding point detecting step of detecting corresponding points on subjects among the plurality of images shot by the focus bracketing step including an image shot at the in-focus position of the main subject and images shot at the focus positions around the in-focus position of the main subject; an image transformation step of transforming the plurality of images excluding a reference image so that positions of the corresponding points will coincide between the reference image and the plurality of images excluding the reference image using the image shot at the in-focus position of the main subject as the reference image; a blur calculating step of calculating blur amounts in the plurality of images including the transformed images according to coordinates of pixels; a filtering step of determining a filter characteristics based on calculation results produced by the blur calculating step and applying digital filtering to the reference image shot at the in-focus position of the main subject; and a recording step of recording an image obtained by the filtering step on a recording medium.

This makes it possible to obtain a blur-emphasized image even if there is camera shake or subject movement. Also, since the image has its blur emphasized using only the reference image, it is possible to vary the blurring smoothly, and thereby obtain a more naturally blurred image.

To achieve the above object, the present invention provides an image processing method, comprising: an input step of allowing inputs of a plurality of images of a same scene shot at different focus positions; a corresponding point detecting step of detecting corresponding points on subjects among the plurality of images; an image transformation step of transforming the plurality of images excluding one reference image so that positions of the corresponding points will coincide between the reference image and the plurality of images excluding the reference image, the reference image being selected from the plurality of images based on a predetermined criterion; an image compositing step of compositing the plurality of images including the transformed images; and an output step of outputting an image obtained by the image compositing step.

This makes it possible to obtain an all-in-focus image from images of the same scene even if there is camera shake or subject movement.

To achieve the above object, the present invention provides an image processing method, comprising: an input step of allowing inputs of a plurality of images of a same scene shot at different focus positions including an in-focus position of the main subject and focus positions around the in-focus position of the main subject; a corresponding point detecting step of detecting corresponding points on subjects among the plurality of images; an image transformation step of transforming the plurality of images excluding a reference image so that positions of the corresponding points will coincide between the reference image and the plurality of images excluding the reference image using the image shot at the in-focus position of the main subject as the reference image; an image compositing step of compositing the plurality of images including the transformed images; and an output step of outputting an image obtained by the image compositing step.

This makes it possible to obtain a blur-emphasized image from images of the same scene even if there is camera shake or subject movement.

To achieve the above object, the present invention provides an image processing method, comprising: an input step of allowing inputs of a plurality of images of a same scene shot at different focus positions including an in-focus position of the main subject and focus positions around the in-focus position of the main subject; a corresponding point detecting step of detecting corresponding points on subjects among the plurality of images; an image transformation step of transforming the plurality of images excluding a reference image so that positions of the corresponding points will coincide between the reference image and the plurality of images excluding the reference image using the image shot at the in-focus position of the main subject as the reference image; a blur calculating step of calculating blur amounts in the plurality of images including the transformed images according to coordinates of pixels; a filtering step of determining a filter characteristics based on calculation results produced by the blur calculating step and applying digital filtering to the reference image shot at the in-focus position of the main subject; and an output step of outputting an image obtained by the filtering step.

This makes it possible to obtain a blur-emphasized image from images of the same scene even if there is camera shake or subject movement. Also, since the image has its blur emphasized using only the reference image, it is possible to vary the blurring smoothly, and thereby obtain a more naturally blurred image.

The present invention, which transforms multiple images so that positions of corresponding points will coincide between the images and composites the images with the corresponding points matched, provides an image pickup apparatus, image processing apparatus, image pickup method, and image processing method which make it possible to obtain an intended all-in-focus image or blur-emphasized image even if there is camera shake or subject movement.

BRIEF DESCRIPTION OF THE DRAWINGS

FIGS. 5A to 5E are diagrams showing image transformations;

FIG. 6 is a flowchart showing an operation of an image compositing process;

FIG. 7 is a diagram showing a Laplacian filter matrix;

DETAILED DESCRIPTION OF THE PREFERRED EMBODIMENTS

Preferred embodiments of the present invention will be described below with reference to the drawings.

First Embodiment

Figure 1:
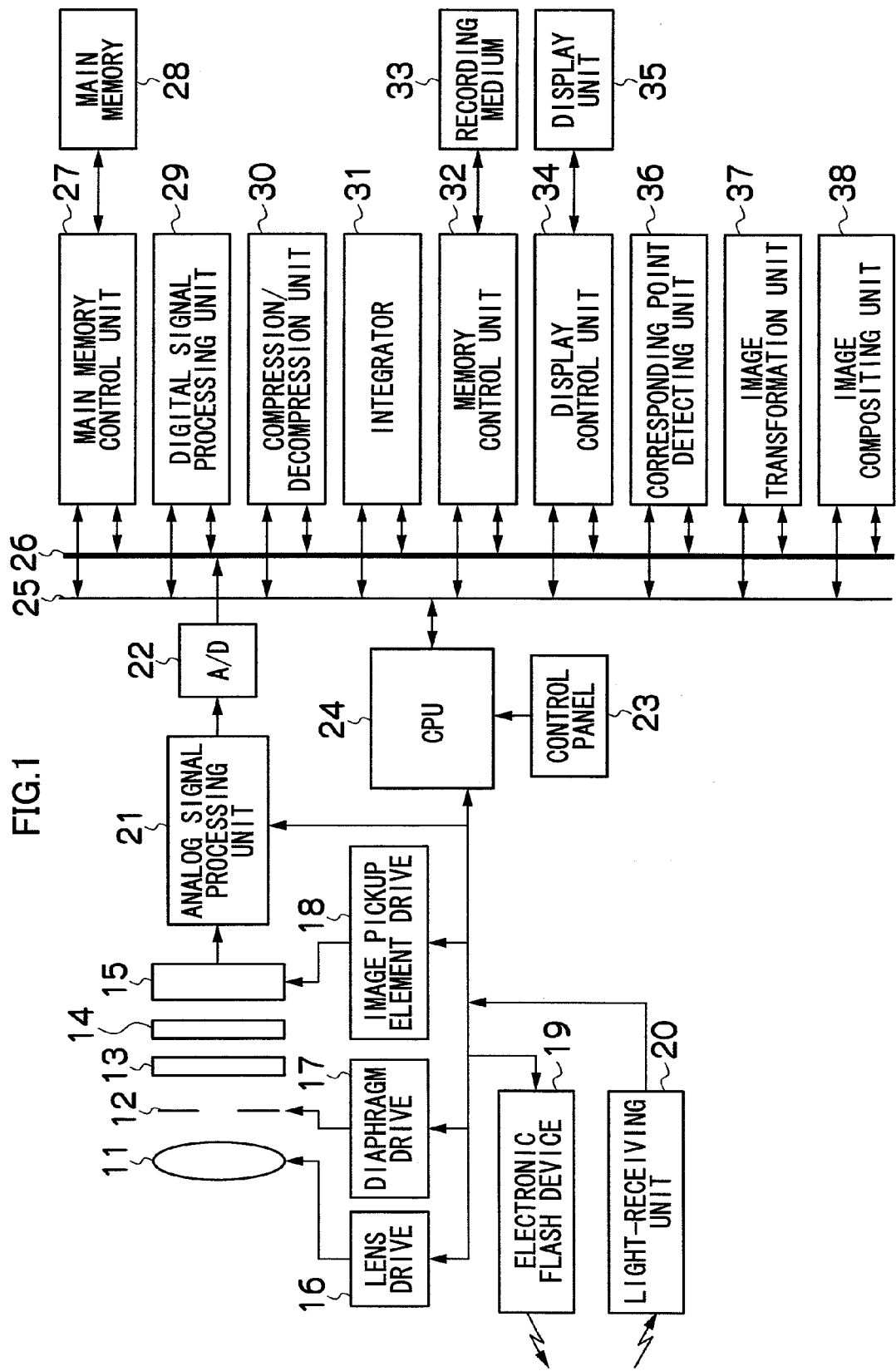
FIG. 1 is a block diagram showing an exemplary internal configuration of a digital camera 1 according to a first embodiment of the present invention.

FIG. 1 is a block diagram showing an exemplary internal configuration of a digital camera 1 according to a first embodiment of the present invention.

A CPU 24 generally controls various circuits in the digital camera 1 based on inputs via a control panel 23 (which includes a shutter switch) and performs processing according to a camera control program.

The CPU 24 controls the circuits via an address bus 25 and data bus 26. Besides, the CPU 24 exchanges necessary data with a main memory 28. Internally, the main memory 28 is divided into a ROM area and RAM area. The ROM area stores the camera control program; a startup image; a shutdown image; GUI images such as menu images and the like used for operation of the digital camera 1; a screen saver image; a progress indicator image (e.g., an animated hourglass) displayed during processing; sound data which represents key-click sounds (shutter noise, etc.), warning sounds, and error sounds; and the like.

When the digital camera 1 is turned on, the CPU 24 detects this, displays the startup image from the main memory 28 on a display unit 35 for a fixed period of time, and puts the digital camera 1 on standby for shooting in shooting mode. During standby for shooting, the CPU 24 displays moving images (live view) on the display unit 35.

By watching the live view displayed on the display unit 35, a user (photographer) adjusts framing, checks a desired subject, checks how a resulting image will look, and sets shooting conditions.

When a shutter switch (not shown) on the control panel 23 is pressed during standby for shooting, the CPU 24 determines in-focus position based on an AF evaluation value calculated by an integrator 31, performs focus control by driving a lens 11 via a lens drive 16, performs exposure control by driving a diaphragm 12 via a diaphragm drive 17, and as a result of this, a subject image is formed on a light-receiving surface of a solid-state image pickup element 15 via the lens 11, the diaphragm 12, an IR cut filter 13, and an optical low-pass filter 14. An electronic flash device 19 is fired as an auxiliary light. Flash light quantity of the electronic flash device 19 is controlled by a light-receiving unit 20. The subject image formed on the light-receiving surface of the solid-state image pickup element 15 is converted into signal charge in quantities proportionate to light quantity of the subject image. On instructions from the CPU 24, the signal charge is sent to an analog signal processing unit 21 based on drive pulses provided by an image pickup element drive 18, subjected to correlated double sampling and subsequent amplification, and then applied to an A/D converter 22.

Dot-sequential R, G, and B signals resulting from analog/digital conversion by the A/D converter 22 are stored in the RAM area of the main memory 28 via a main memory control unit 27.

A digital signal processing unit 29 reads the R, G, and B raw signals out of the RAM area of the main memory 28, applies digital gains to the R, G, and B raw signals according to light source types thereby adjusting white balance, and generates R, G, and B signals through gamma processing (gradation conversion) and sharpness processing. Furthermore, the digital signal processing unit 29 generates a luminance signal Y and chroma signals Cr, Cb (YC signal) through YC signal processing and stores the generated signals in the RAM area of the main memory 28 again.

The YC signal thus stored in the RAM area of the main memory 28 is compressed into a predetermined format by a compression/decompression unit 30 and recorded on a removable recording medium 33 of the digital camera 1 via a memory control unit 32.

When the user selects playback mode using various controls on the control panel 23, an image file of a final frame is read out of the recording medium via the memory control unit 32. Compressed data of the image file is decompressed into a non-compressed YC signal by the compression/decompression unit 30. The decompressed YC signal is converted into a signal format for display and displayed on the display unit 35. Consequently, the image of the final frame recorded in the recording medium is displayed.

Figure 2:
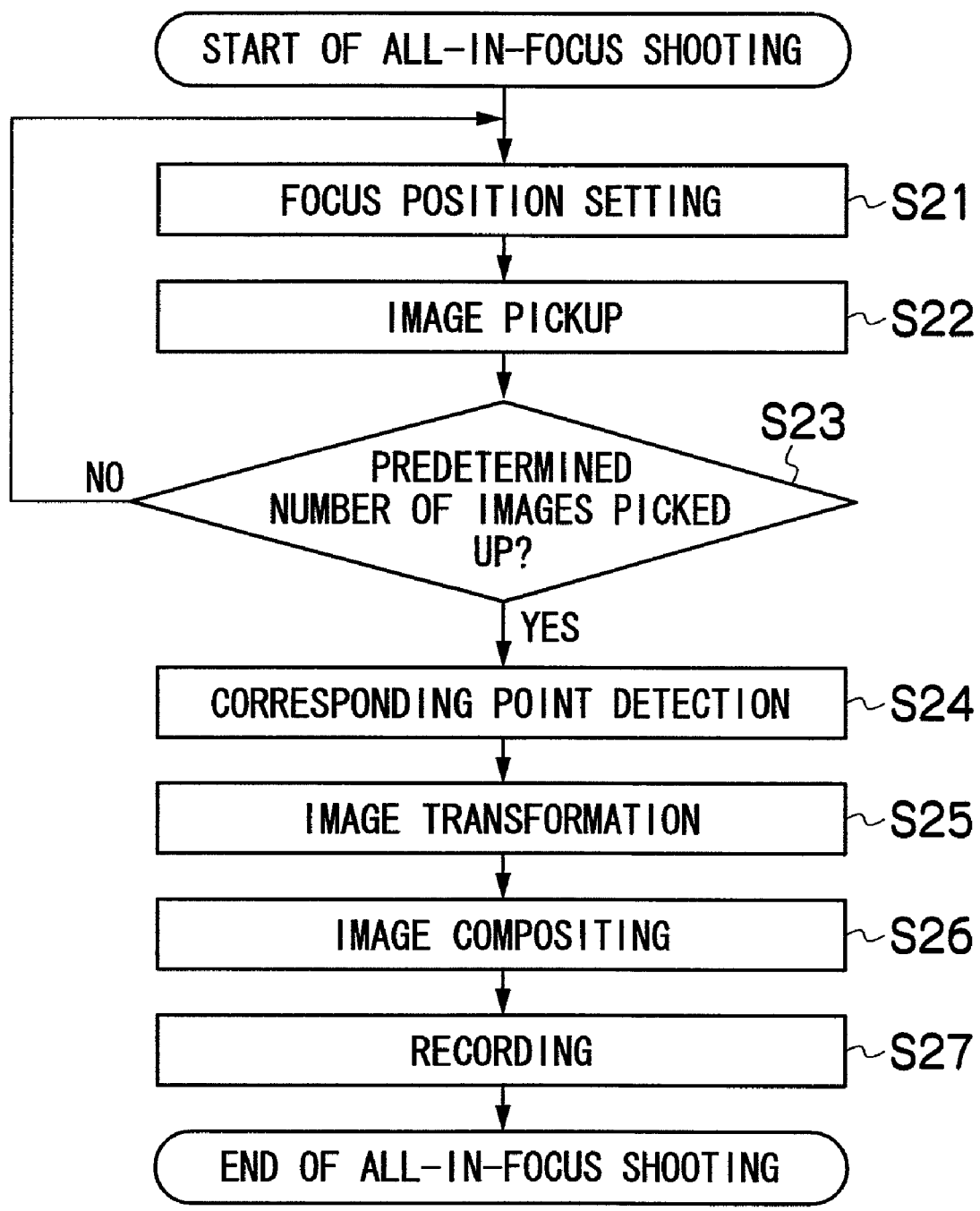
FIG. 2 is a flowchart showing an operation of all-in-focus shooting mode used to shoot all-in-focus images.

Next, all-in-focus shooting with the digital camera 1 will be described. FIG. 2 is a flowchart showing an operation of all-in-focus shooting mode used to shoot all-in-focus images. In the all-in-focus shooting mode, the digital camera 1 according to the present invention takes focus bracketing shots, detects corresponding points among photographic images, transforms the images so that positions of the corresponding points will coincide among the images, and composites the transformed images, and thereby obtains an all-in-focus image.

The user selects all-in-focus shooting mode using a mode switch (not shown) on the control panel 23 and presses the shutter switch on the control panel 23. Based on the user actions, the CPU 24 sets a focus position (Step S21) and takes a shot (Step S22). The CPU 24 counts the number of shots (Step S23). If a predetermined number is not reached, the CPU 24 sets another focus position (Step S21) and takes another shot (Step S22). By repeating shots at different focus positions in this way, the CPU 24 takes a predetermined number of shots (focus bracketing shots). Resulting photographic images are stored in the RAM area of the main memory 28.

The predetermined number may be set in advance in the digital camera 1 or may be made user-configurable. Alternatively, the number may be determined according to a depth of field which depends on shooting conditions. To obtain an all-in-focus image, every subject in all the images must be in focus at least in one of the images. Thus, when the depth of field is shallow, it is necessary to reduce amounts of movement of the focus position and thereby increase the number of exposures. On the other hand, when the depth of field is deep, it is possible to increase the amounts of movement of the focus position, reducing the number of exposures, and avoid shooting an unnecessarily large number of exposures which will consume extra memory, resulting in an increased processing load.

Regarding the movements of the focus position, the focus position may be changed from close to distant, distant to close, or at random.

When the predetermined number of shots are taken, corresponding points among photographic images are detected (Step S24).

Figure 3B:
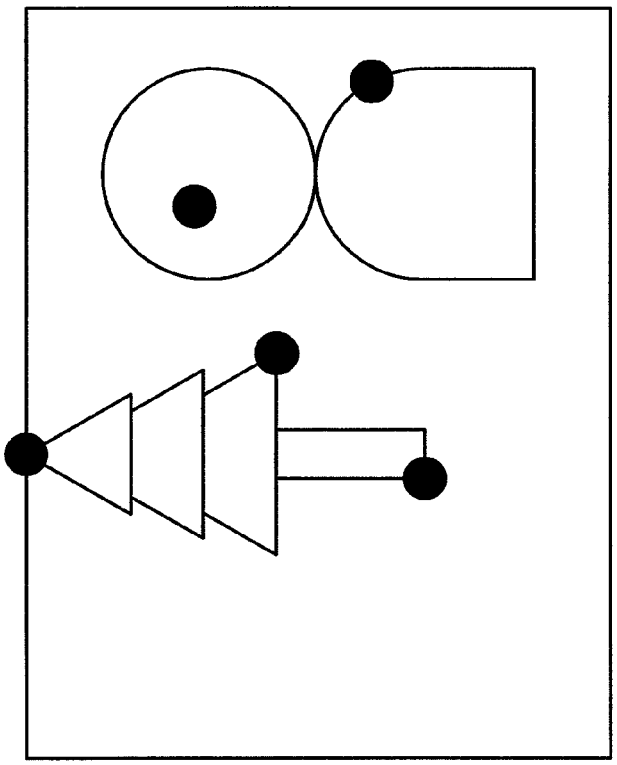
FIGS. 3A and 3B are diagrams showing images obtained as a result of focus bracketing shooting.
Figure 3A:
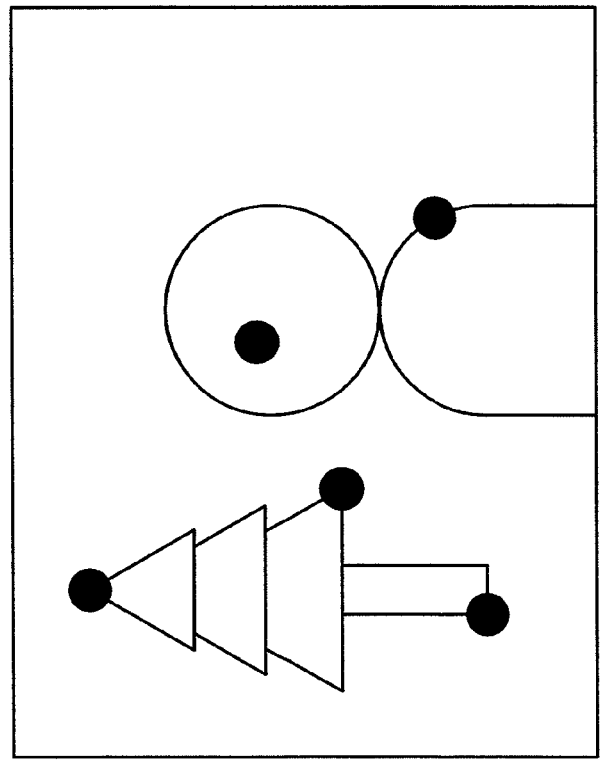
Figure 4:
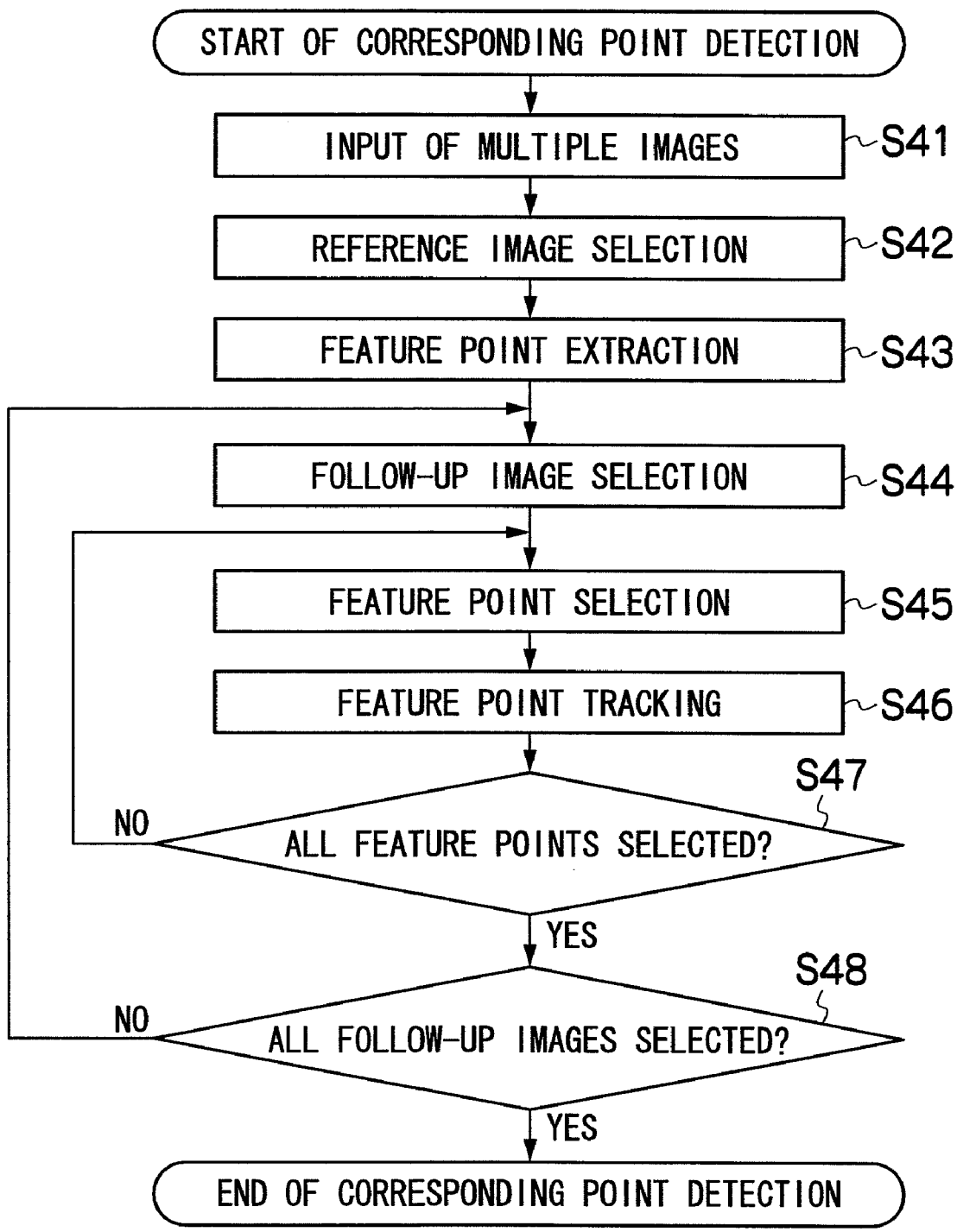
FIG. 4 is a flowchart showing an operation of corresponding point detection on the digital camera 1.

Now, corresponding point detection in images will be described. The corresponding point detection involves finding positional relationship among corresponding points in multiple images. FIGS. 3A and 3B are diagrams showing images obtained as a result of focus bracketing shooting. A corresponding point detecting unit 36 extracts feature points from a reference image shown in FIG. 3A, keeps track of where the feature points are located in a follow-up image in FIG. 3B, and thereby detects corresponding points. FIG. 4 is a flowchart showing an operation of corresponding point detection on the digital camera 1.

First, the CPU 24 inputs multiple images obtained as a result of focus bracketing shooting into the corresponding point detecting unit 36 (Step S41). Next, the corresponding point detecting unit 36 selects a reference image from the multiple images (Step S42) and extracts feature points from the reference image (Step S43). The reference image may be selected by a method predefined in the digital camera 1 or by the user. In this case, the image shot first is used as the reference image. Various techniques for selecting feature points have been proposed, but with a technique used herein, when the standard deviation of luminance in a predetermined area around a point is equal to or larger than a predetermined value, the point is selected as a feature point. Dots in FIG. 3A indicate feature points in the image in FIG. 3A. A larger number of feature points results in higher accuracy in subsequent processing, but an increased number of feature points means an increased processing load, and thus the number of feature points may be determined appropriately depending on hardware performance.

Next, a follow-up image is selected (Step S44). Of the multiple images inputted in Step S41, an image other than the reference image is selected.

One of the feature points extracted from the reference image is selected from the selected follow-up image (Step S45) to keep track of where the feature point is located in the follow-up image (Step S46). Various tracking techniques have been proposed, but a technique (block matching technique) used here involves finding coordinates which maximize a cross-correlation coefficient in a predetermined area around the selected feature point. According to the present invention, since focus bracketing is used for shooting, directions and amounts of movement of feature points along with movements of focus position are predictable. Movements of the corresponding points, which move radially from a screen center or toward the screen center when the focus position moves can be predicted, from the movement direction of the focus position. Amounts of movements of the corresponding points can also be predicted from the amount of movement of the focus position. Thus, by detecting corresponding points with the above factors taken into consideration, it is possible to improve detection performance as well as detection accuracy and speed.

When the tracking of the feature point is finished, it is determined whether all the feature points have been processed (Step S47). If there is any feature point yet to be processed, the feature point is selected (Step S45) and tracked (Step S46). All the feature points are tracked in this way.

When all the feature points have been processed, it is determined next whether all the follow-up images have been processed (Step S48). As described above, the images other than the reference image are targeted. If there is any follow-up image yet to be processed, the steps described above are repeated with respect to the follow-up image. When all the follow-up images have been processed, the corresponding point detection process is finished.

When the corresponding point detection process is finished, image transformation is performed next (as in Step S25 in FIG. 2). In the image transformation process, an image transformation unit 37 transforms the follow-up images so that the corresponding points in each follow-up image obtained in the corresponding point detection process will coincide in position with the corresponding points in the reference image as much as possible. FIGS. 5A to 5D are diagrams showing image transformations. If, as shown in FIG. 5B, the corresponding points have been displaced from and parallel to those in the reference image shown in FIG. 5A, the follow-up image is translated parallel to itself. If the corresponding points have been moved rotationally as shown in FIG. 5C, the follow-up image is rotated. If the corresponding points have been scaled up (or scaled down), the follow-up image is scaled down (or scaled up). For such an image transformation, a movement vector can be determined in such a way as to minimize the sum total of distances between paired corresponding points. The translation, rotation, and scaling-up/scaling-down are performed by means of affine transformations.

On the other hand, if there are complicated motions between the reference image and follow-up image as shown in FIG. 5E, warping is performed to match all the corresponding points between the reference image and follow-up image more accurately. The warping involves selecting a movement vector which will cause the corresponding points in each pair to match completely and find points around the corresponding points by interpolation.

The multiple images among which the corresponding points are matched as much as possible are composited (as in Step S26 in FIG. 2). FIG. 6 is a detailed flowchart showing an operation of an image compositing process in FIG. 2. The image compositing process involves combining pixel values by extracting each pixel value from the sharpest, i.e., the best-focused of multiple images to obtain a final image which provides high sharpness anywhere within the image, i.e., to obtain an all-in-focus image.

First, an image compositing unit 38 selects a pixel to be processed (Step S61). Regarding the order of pixel selection, pixels may be selected in order starting from an edge of a screen, but another order may be used as well. Next, an image is selected (Step S62). In the selected image, the sharpness of the pixel selected in Step S61 is calculated (Step S63).

To calculate the sharpness, the absolute values of output values from Laplacian filtering are calculated. FIG. 7 is a diagram showing a Laplacian filter matrix. The Laplacian filtering allows edge detection, and the absolute values of output values from Laplacian filtering represent sharpness. Regarding relationship between image blurring and sharpness, the sharpness of pixels increases with decreases in image blurring and decreases with increases in image blurring. Incidentally, kernels for Laplacian filters are not limited to this example. Also, sharpness calculation filters other than Laplacian filters may be used.

Next, it is determined whether the sharpness of all the images has been calculated (Step S64). If there is any image whose sharpness has not been calculated yet, the image is selected (Step S62). In the selected image, the sharpness of the pixel selected in Step S61 is calculated (Step S63). In this way, the sharpness of the pixel selected in Step S61 is calculated in all the images.

Next, the pixel value of the image with maximum sharpness is outputted (Step S65). The absolute values of output values from Laplacian filtering calculated in Step S63 are compared among the images selected in Step S61 and the pixel value of the image which gives a maximum absolute value is adopted as an output pixel. Alternatively, the output pixel may be calculated using a weighted average by assigning larger weights to pixels of sharper images.

The above steps are repeated for all the pixels. It is determined whether all the pixels have been processed. If they have, the image compositing process is finished.

When the image compositing process is finished, the CPU 24 records (Step S27 in FIG. 2) the output image of the image compositing unit 38 on the recording medium 33 via a memory control unit 32 and finishes the shooting of the all-in-focus image.

Instead of being recorded on the recording medium 33, the output image of the image compositing unit 38 may only be displayed on the display unit 35 via a display control unit 34, displayed on an external monitor via an external interface (not shown), or outputted as printed matter from a printer or the like.

Consequently, an all-in-focus image can be obtained even if there is camera shake or subject movement.

Methods for extracting feature points, methods for tracking feature points, methods for image transformation, and methods for calculating pixel sharpness are not limited to those described in the present embodiment, and other methods many be used as well.

Second Embodiment

Figure 8:
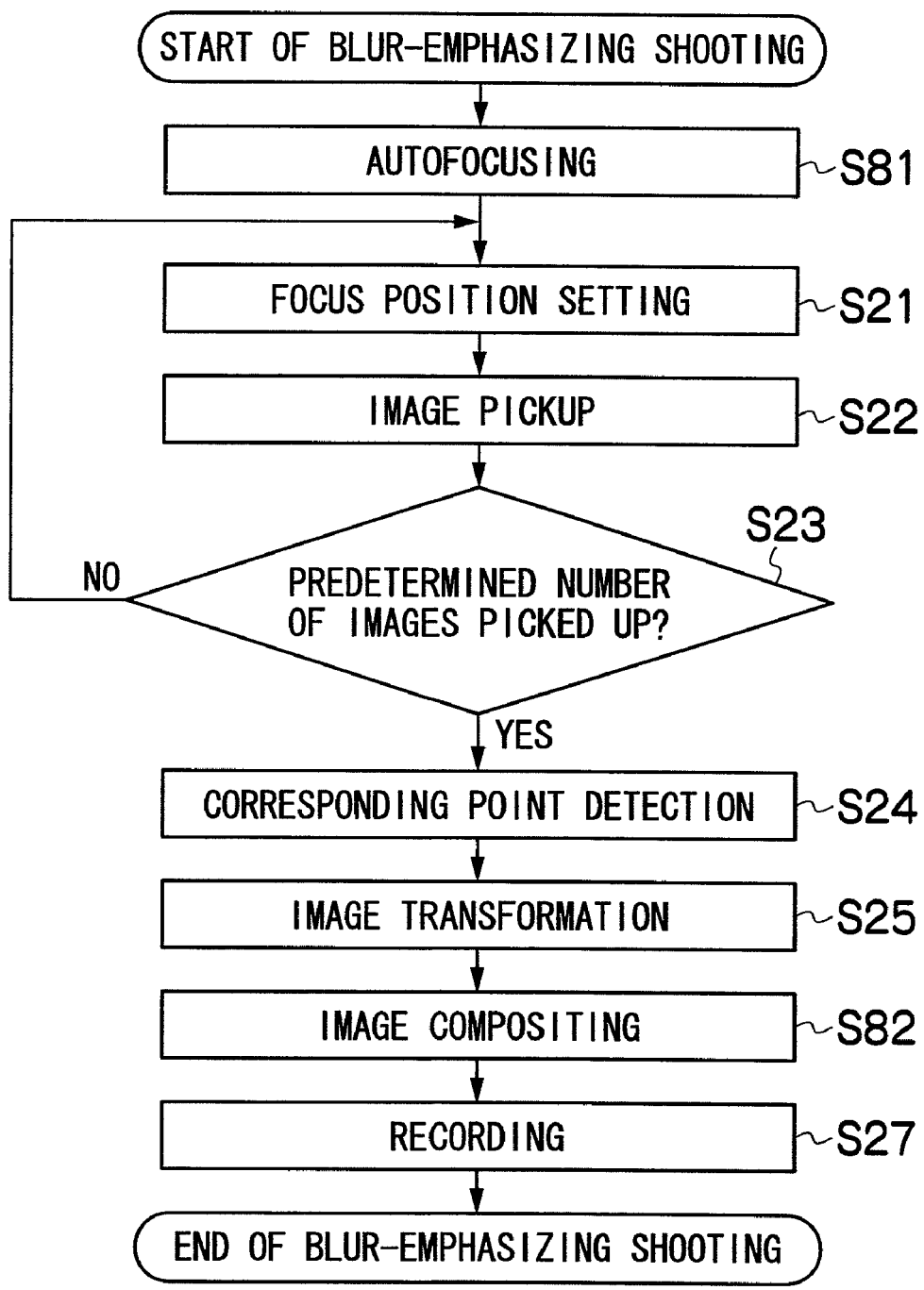
FIG. 8 is a flowchart showing an operation of blur-emphasizing shooting mode.

Next, blur-emphasizing shooting with the digital camera 1 will be described. FIG. 8 is a flowchart showing an operation of blur-emphasizing shooting mode used to shoot a blur-emphasized image. Steps similar to those in the flowchart of FIG. 2 are designated by the same step numbers as the corresponding steps in FIG. 2, and detailed description thereof will be omitted.

The blur-emphasizing shooting mode on the digital camera 1 according to the present invention involves taking shots at and around an in-focus position of a main subject using auto focus bracketing, detecting corresponding points among photographic images, transforming the photographic images so that positions of the corresponding points will coincide among the photographic images, and obtaining a blur-emphasized image by compositing the transformed images.

First, the user selects blur-emphasizing shooting mode using a mode switch (not shown) on the control panel 23. When the user presses the shutter switch on the control panel 23, auto-focusing (AF) on the main subject is performed (Step S81). The auto-focusing may be the same as auto-focusing for normal photography. Before a shot is taken, the integrator 31 calculates AF evaluation value such as output values of a band pass filter with the focus position of the lens being moved and the CPU 24 determines the focus position with the highest AF evaluation value to be an in-focus position.

Figure 9:
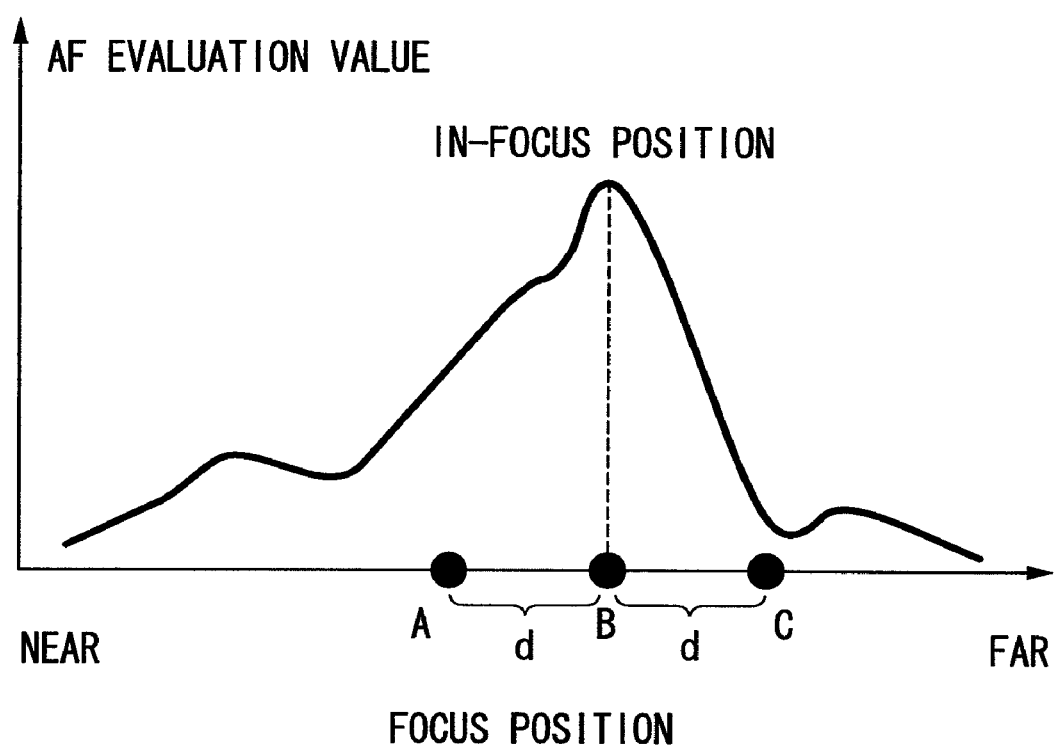
FIG. 9 is a graph showing focus positions and AF evaluation value at the focus positions.

In the blur-emphasizing shooting mode, focus-bracketed shots are taken by moving the focus positions so as to include positions at and around the in-focus position of the main subject. FIG. 9 is a graph showing a relationship between the focus position of the digital camera 1 and the AF evaluation value of the main subject, where the focus position is represented by the ordinate and the AF evaluation value is represented by the abscissa. The focus position with the highest AF evaluation value corresponds to the in-focus position of the main subject. If the in-focus position of the main subject is designated by B, in the focus bracketing shooting according to the present embodiment, three points—the in-focus position B and focus positions A and C a predetermined distance d away from the in-focus position B on both sides of the in-focus position B—are treated as focus positions. The value of d may be a fixed value prestored in the digital camera 1 or a user-configurable value. Also, the value of d may be varied with the depth of field. Since the degree of blurring varies depending on the depth of field, an appropriately blurred image can be obtained as desired if the value of d is varied with the depth of field.

Focus-bracketed shots are taken at the focus positions thus determined (Steps S21 to S23) as in the case of all-in-focus shooting mode according to the first embodiment. Resulting photographic images are stored in the RAM area of the main memory 28.

When the focus bracketing shooting is finished, corresponding points among photographic images are detected (Step S24). In this case, the image shot at the in-focus position B of the main subject is used as the reference image. The corresponding points are detected in the same way as in the first embodiment.

When the corresponding point detection process is finished, image transformation is performed next (Step S25). Again, the image transformation is performed in the same way as in the first embodiment.

Figure 10:
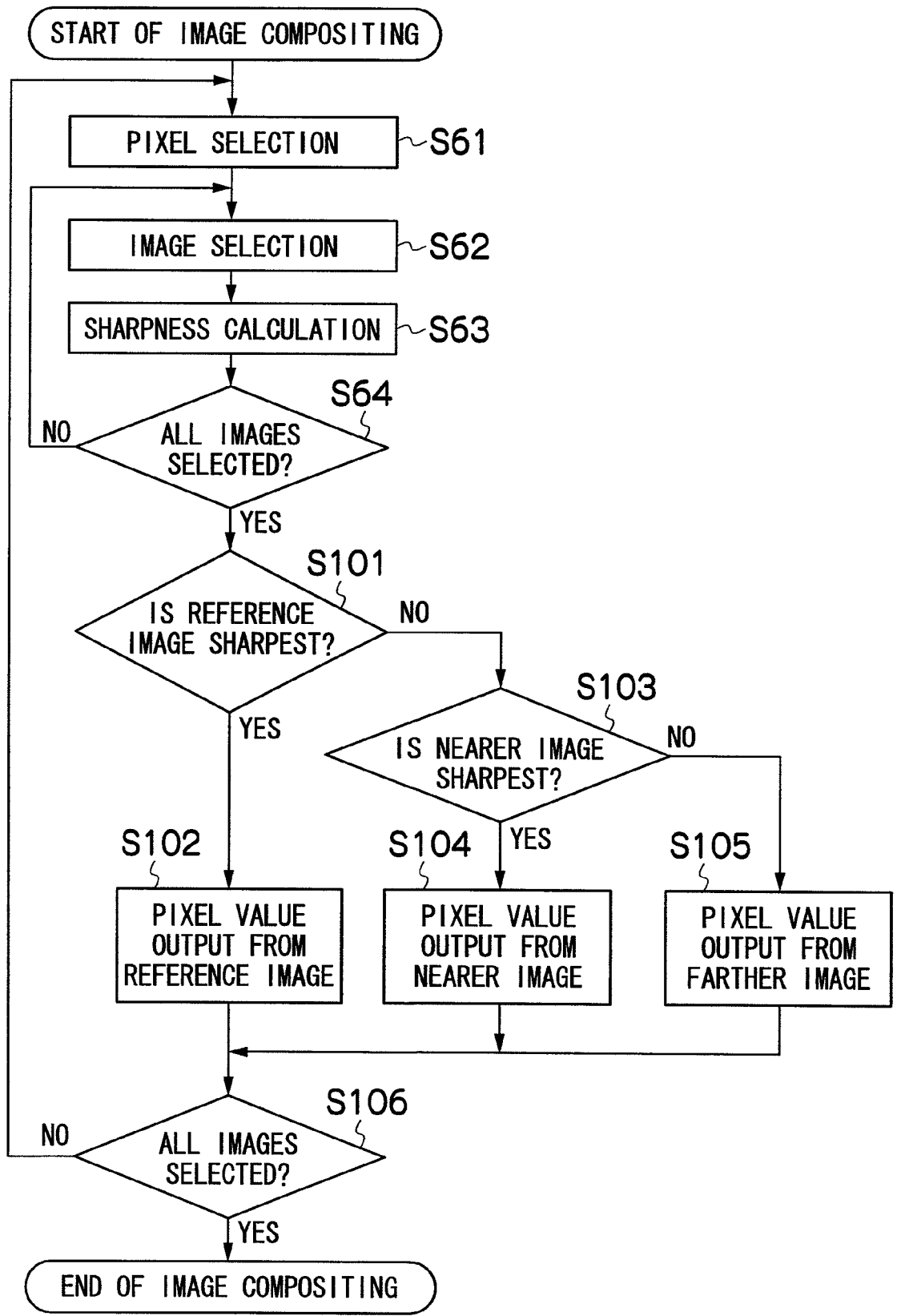
FIG. 10 is a flowchart showing an operation of an image compositing process according to a second embodiment.

When the image transformation process is finished, images are composited next. FIG. 10 is a flowchart showing an operation of an image compositing process. Steps similar to those in the flowchart of FIG. 6 are designated by the same step numbers as the corresponding steps in FIG. 6, and detailed description thereof will be omitted. In the blur-emphasizing shooting mode on the digital camera 1 according to the second embodiment of the present invention, the image compositing process obtains a blur-emphasized image by selecting the pixel in the reference image if the reference image is the sharpest of the multiple images, or selecting a pixel contained in an image shot at a focus position symmetrical, with respect to the in-focus position of the main subject, to the focus position which provides the image containing the sharpest pixel if an image other than the reference image is the sharpest.

Figure 11A:
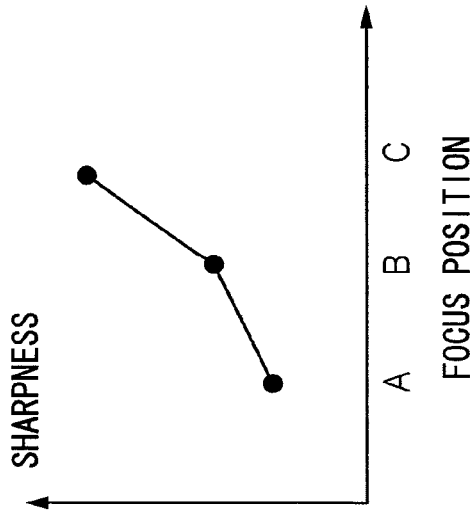
FIGS. 11A to 11C are graphs comparing sharpness among images shot at different focus positions: an in-focus position B of a main subject, focus position A in front of the in-focus position B, and focus position C behind the in-focus position B.
Figure 11B:
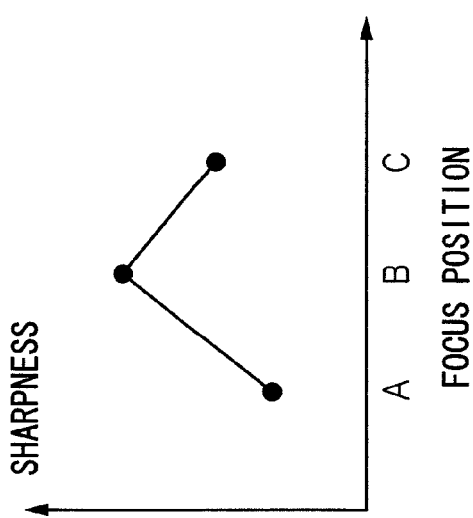
Figure 11C:
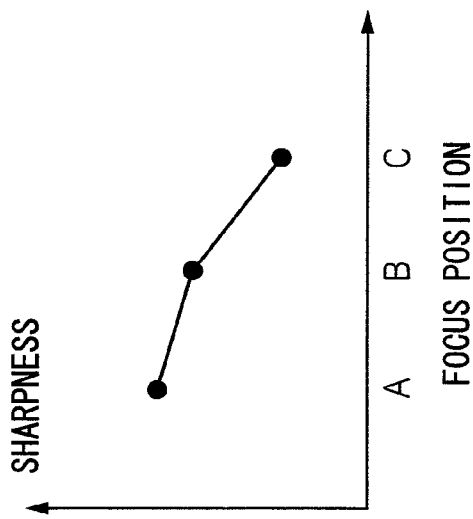

As in the case of the first embodiment, the image compositing unit 38 selects a pixel to be processed (as in Step S61 in FIG. 6) and calculates the sharpness of the selected pixel in each image (S62 to S64). FIGS. 11A to 11C are graphs comparing sharpness among images shot at different focus positions: the in-focus position B, focus position A in front of the in-focus position B, and focus position C behind the in-focus position B. In terms of sharpness, relationships among the images shot at focus positions A, B, and C can be classified into three cases: a case in which the image shot at C is the sharpest (FIG. 11A), a case in which the image shot at B is the sharpest (FIG. 11B), and a case in which the image shot at A is the sharpest (FIG. 11C).

When the sharpness of the selected pixel has been calculated in all the images, it is determined, based on the calculated sharpness, whether the reference image is the sharpest, i.e., whether the sharpness satisfies the relationship in FIG. 11B (Step S101). If the reference image is the sharpest, the pixel value of the reference image is outputted (Step S102). If the reference image is not the sharpest, it is determined whether the image shot at the focus position farther than the in-focus position of the main subject is the sharpest, i.e., whether the sharpness satisfies the relationship in FIG. 11A (Step S103). If the image shot at the focus position farther than the in-focus position of the main subject is the sharpest, the pixel value of the image shot at the focus position nearer than the in-focus position of the main subject is outputted (Step S104). If the image shot at the focus position farther than the in-focus position of the main subject is not the sharpest, then the image shot at the focus position nearer than the in-focus position of the main subject is the sharpest, i.e., the sharpness satisfies the relationship in FIG. 1 IC, and thus the pixel value of the image shot at the focus position farther than the in-focus position of the main subject is outputted (Step S105).

The above steps are repeated for all the pixels. When it is determined that all the pixels have been processed (Step S106), the image compositing process is finished.

When the image compositing process is finished, the CPU 24 records the output image of the image compositing unit 38 on the recording medium 33 via the memory control unit 32 (Step S27) and finishes the shooting of the blur-emphasized image.

In this way, by selecting pixel values which give a strong blur at the same coordinates as unsharp pixels in the image shot at the in-focus position B of the main subject, it is possible to obtain a blur-emphasized image. When there are more than three focus positions, an image can be selected from multiple images shot at focus positions located across the in-focus position from the focus position which gives a maximum value of sharpness according to a desired degree of sharpness. That is, when it is desired to obtain a more strongly blurred image, pixel values of less sharp images can be outputted.

Incidentally, although according to the present embodiment, focus-bracketed shots are taken at the in-focus position of the main subject and at focus positions A and C a distance d away from the in-focus position, A and B may not be symmetrical with respect to the in-focus position and may be away from the in-focus position by different distances d and d'.

Also, the image compositing process according to the present embodiment shown in FIG. 10 may be applied to images without corresponding point detection and image transformation. That is, the image compositing process may be applied directly to the multiple images obtained by focus bracketing shooting.

Third Embodiment

Figure 12:
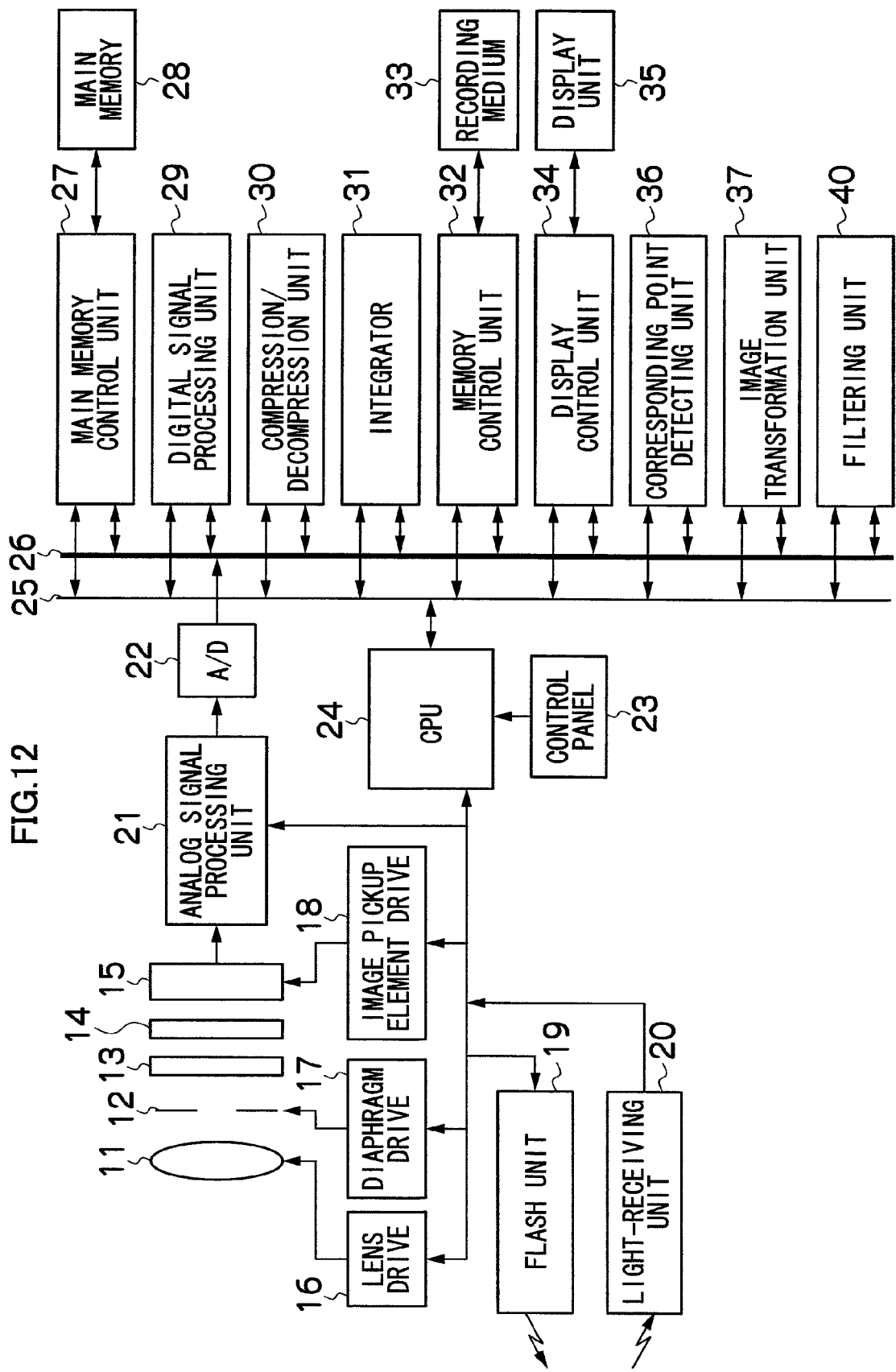
FIG. 12 is a block diagram showing an exemplary internal configuration of a digital camera 1 according to a third embodiment of the present invention.

Next, blur-emphasizing shooting according to a third embodiment of the present invention will be described. FIG. 12 is a block diagram showing an exemplary internal configuration of a digital camera 1 according to the third embodiment of the present invention. FIG. 12 differs from the block diagram in FIG. 1 only in that there is a filtering unit 40 instead of the image compositing unit 38.

Figure 13:
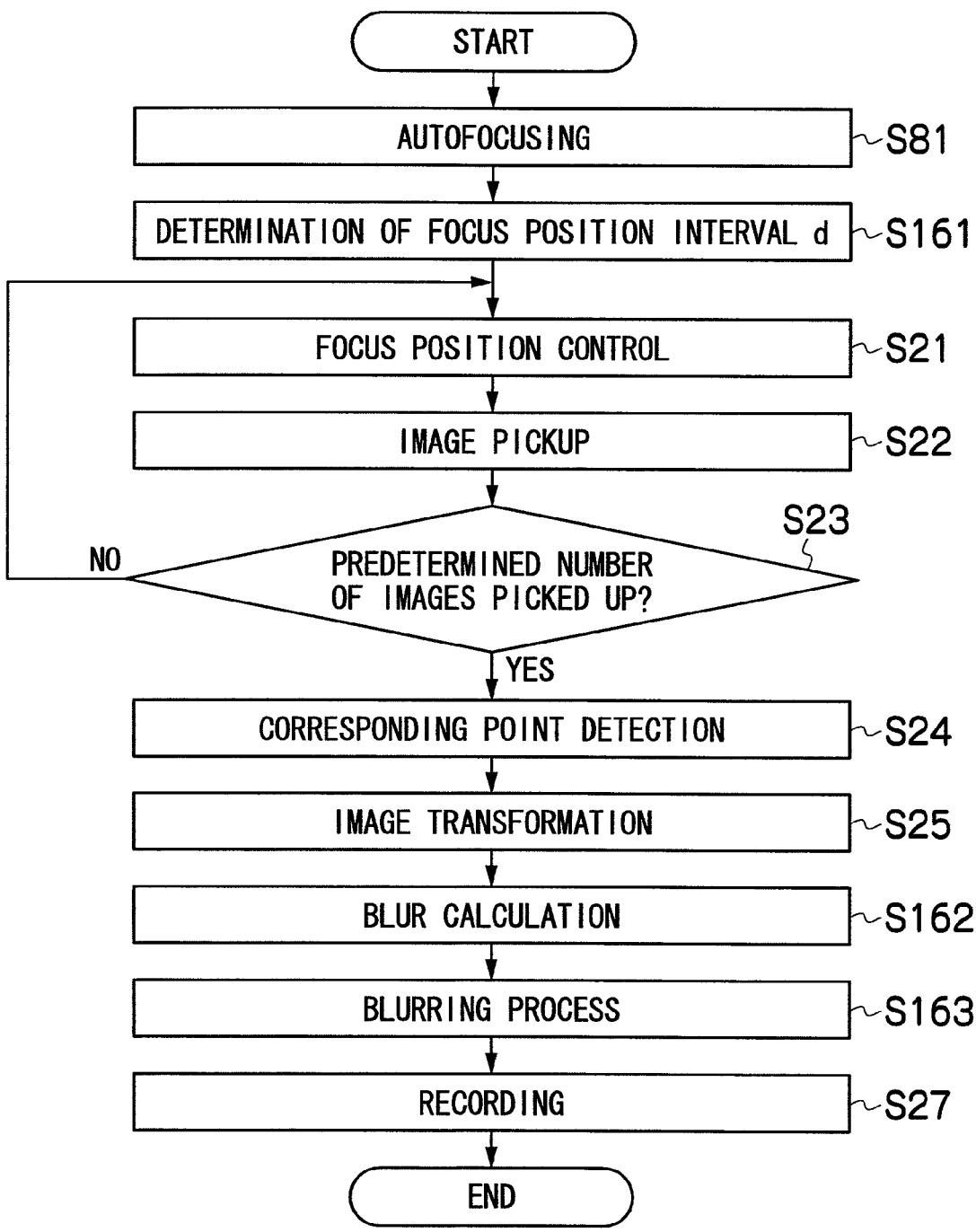
FIG. 13 is a flowchart showing an operation of blur-emphasizing shooting mode according to the third embodiment of the present invention.

FIG. 13 is a flowchart showing an operation of blur-emphasizing shooting mode on the digital camera 1. Steps similar to those in the flowcharts of FIGS. 2 and 8 are designated by the same step numbers as the corresponding steps in FIGS. 2 and 8, and detailed description thereof will be omitted. The blur-emphasizing shooting mode on the digital camera 1 according to the third embodiment of the present invention involves taking shots at and around an in-focus position of a main subject using auto focus bracketing, detecting corresponding points among photographic images, transforming the photographic images so that positions of the corresponding points will coincide among the photographic images, calculating the sharpness of each pixel in the transformed images, filtering a reference image using filter factors based on the sharpness, and thereby obtaining a blur-emphasized image.

As in the case of the above embodiments, when the user presses the shutter switch on the control panel 23, auto-focusing on the main subject is performed (Step S81), and then a focus position interval is determined (Step S161).

Figure 14:
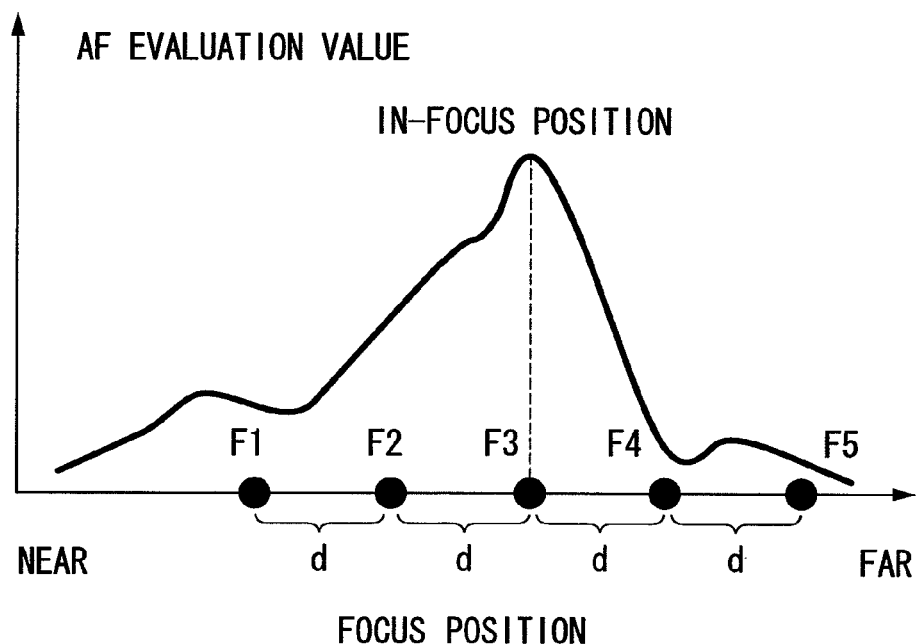
FIG. 14 is a graph showing focus positions and AF evaluation value at the focus positions.

According to the present embodiment, the focus positions used for focus bracketing include the in-focus position of the main subject and focus positions in front of and behind the in-focus position. In this case, five focus positions are used for focus bracketing as shown in FIG. 14: the in-focus position F3 of the main subject, focus positions F2 and F4 a focus interval d away from the in-focus position F3 on both sides of the in-focus position F3, and focus positions F1 and F5 two focus intervals 2d away from the in-focus position F3 on both sides of the in-focus position F3. Incidentally, images shot at focus positions F1 to F5 are designated as images 1 to 5, respectively.

Figure 15:
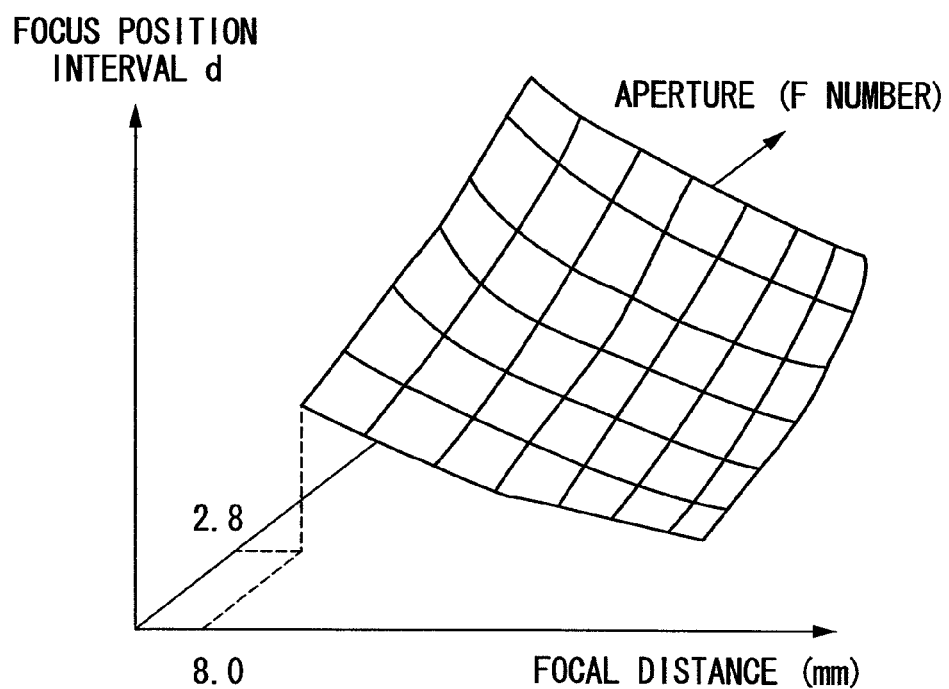
FIG. 15 is a graph showing a relationship among aperture, focal length, and focus position interval d.

FIG. 15 is a graph three-dimensionally showing a relationship among aperture and focal length for shooting and focus position interval d for focus bracketing. As shown in the figure, d is set small when the depth of field is shallow due to a small aperture (f number) or long focal length, and d is set large when the depth of field is deep due to a large aperture (f number) or short focal length. The CPU 24 determines the focus interval d based on these settings stored in the ROM area of the main memory 28. This makes it possible to obtain differently focused images suitable for blur emphasis at any aperture and focal length. Incidentally, the focus interval d may not be fixed, and may be varied, for example, with the distance from the in-focus position.

Once the focus interval d is determined based on the aperture and focal length for shooting, focus-bracketed shots are taken at the focus positions F1 to F5 (Steps S21 to S23). The order of shooting may be determined as appropriate. Photographic images are stored in the RAM area of the main memory 28.

When the focus bracketing shooting is finished, the CPU 24 detects corresponding points among photographic images (Step S24) using the image shot at the in-focus position of the main subject as the reference image. The corresponding points are detected in the same way as in the first embodiment. When the corresponding point detection process is finished, image transformation is performed next (Step S25).

Figure 16:
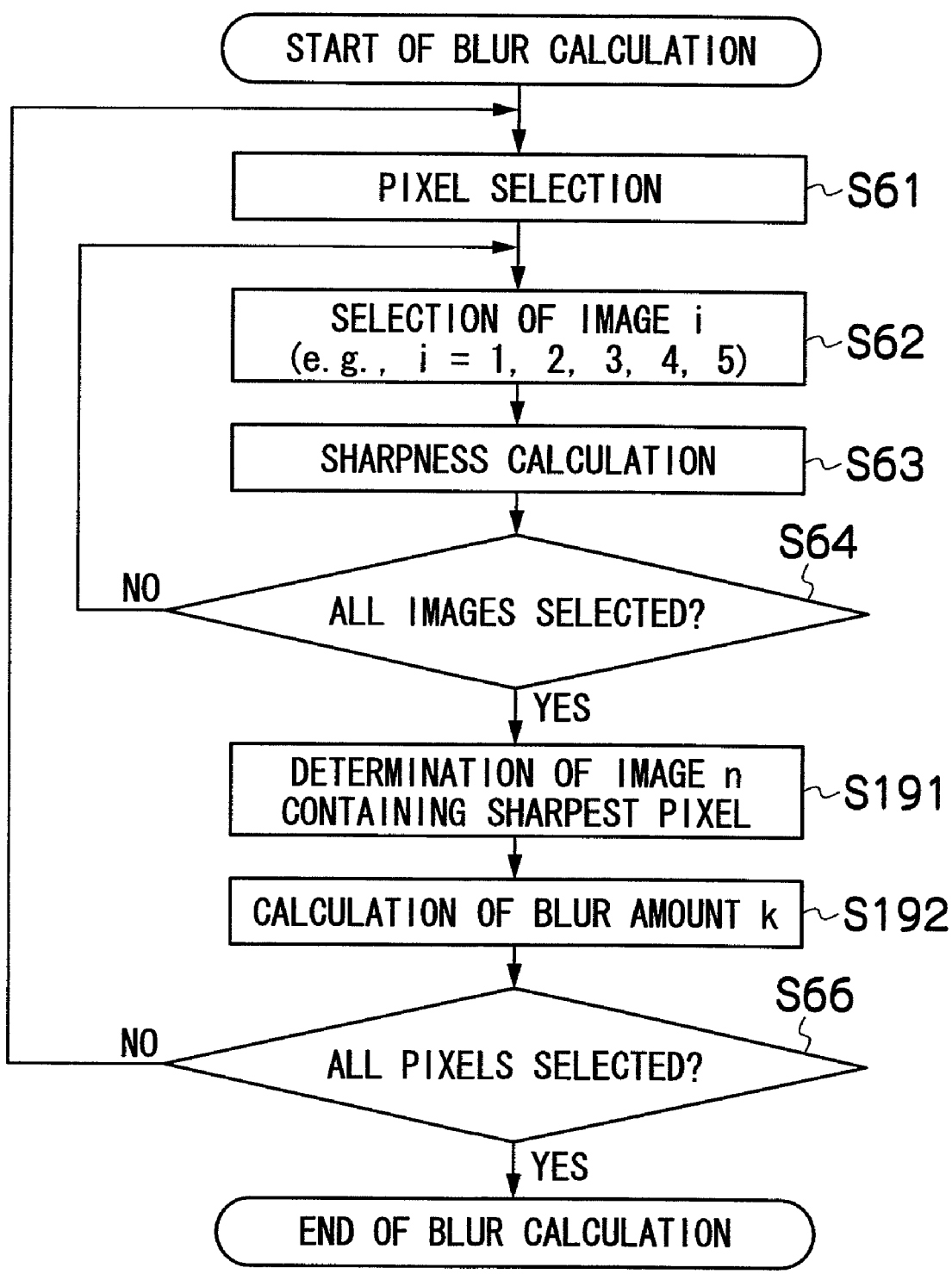
FIG. 16 is flowchart showing an operation of a blur calculation process.

When the image transformation process is finished, blur amounts is calculated (Step S162). FIG. 16 is a flowchart showing an operation of a blur calculation process. Steps similar to those in the flowchart of FIG. 6 are designated by the same step numbers as the corresponding steps in FIG. 6, and detailed description thereof will be omitted.

First, the filtering unit 40 selects the pixel to be processed (Step S61) and then selects an image (Step S62). In the selected image, the sharpness of the pixel selected in Step S61 is calculated (Step S63). To calculate the sharpness, the absolute values of output values from Laplacian filtering are calculated as in the case of the first embodiment. The sharpness of the pixel selected in Step S61 is calculated in all the images.

When it is determined that the sharpness of all the images has been calculated (Step S64), an image number n of the image containing the sharpest pixel is determined (Step S191) and a blur amount k is calculated (Step S192).

If the image number of the image shot at the in-focus position of the main subject is c, the blur amount k is given by:

$$k = u \times (n - c) \qquad \text{(Formula 1)}$$

where u is the degree of blurring specified by the user. If u is larger than 1.0, the image is blurred more than a default setting and if u is smaller than 1.0, the image is blurred less than a default setting. The user can specify the degree u of blurring by manipulating the control panel 23. On the other hand, according to the present embodiment, c=3.

The blur amount k is calculated for every pixel. When it is determined that all the pixels have been processed (Step S66), the blur calculation process is finished.

Figure 17:
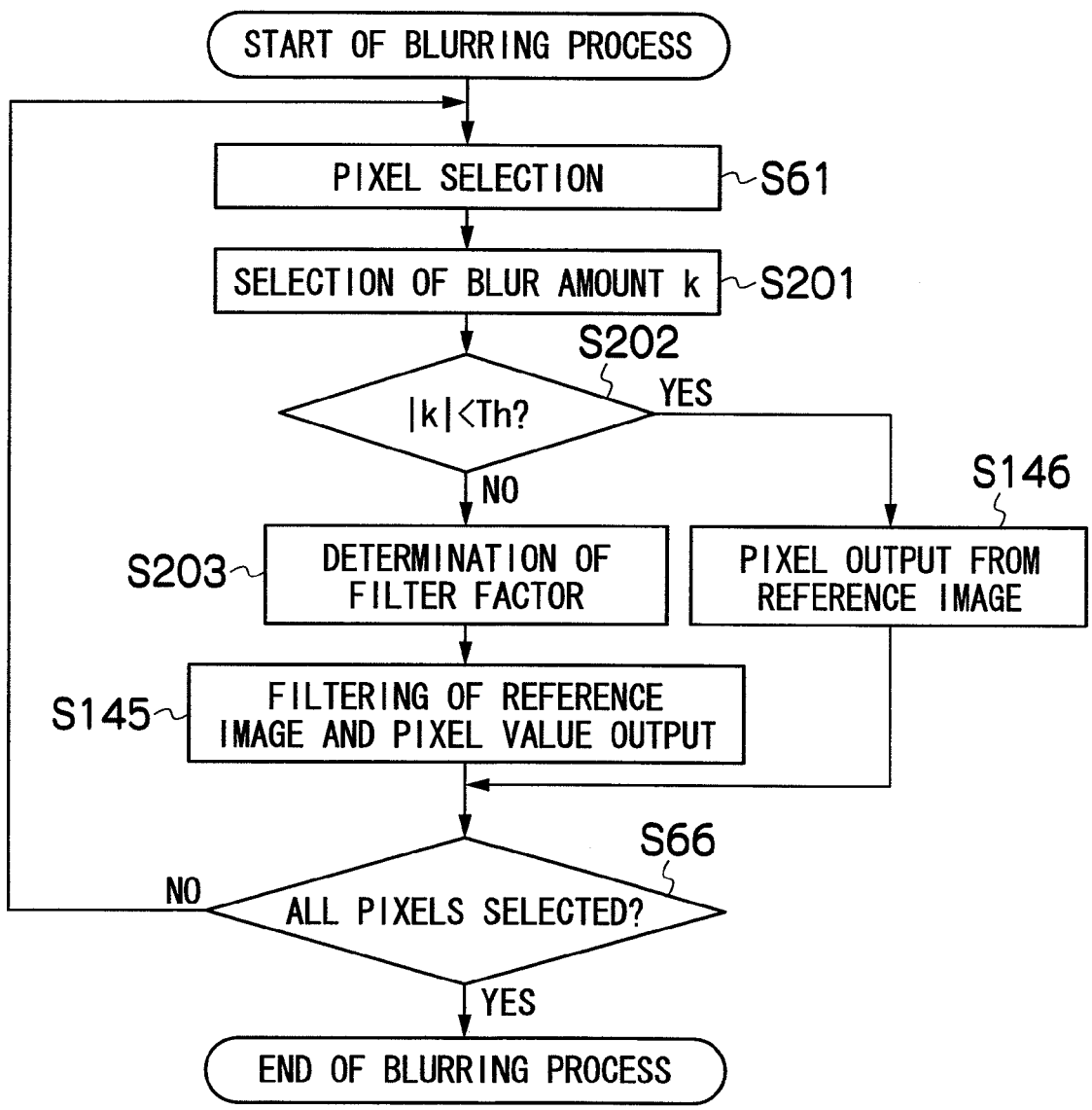
FIG. 17 is a flowchart showing an operation of a blurring process.

When the blur calculation process is finished, a blurring process is performed (Step S163). FIG. 17 is a flowchart showing an operation of the blurring process. According to the present embodiment, Gaussian filters are used for the blurring process.

First, the filtering unit 40 selects a pixel (Step S61). Then, the filtering unit 40 selects the blur amount k for the selected pixel, i.e., reads the blur amount k which has been calculated in Step S192 in FIG. 16 and stored in the RAM area of the main memory 28.

Next, the filtering unit 40 compares the absolute value |k| of the blur amount with a predetermined threshold Th (Step S202). If the predetermined threshold Th is larger, the filtering unit 40 regards the pixel as corresponding to an in-focus point and outputs the pixel value obtained at the in-focus position F3 of the main subject (Step S146). If the absolute value |k| of the blur amount is larger, the filtering unit 40 regards the pixel as corresponding to a point to be blurred and determines a filter factor (Step S203).

Figure 18A:
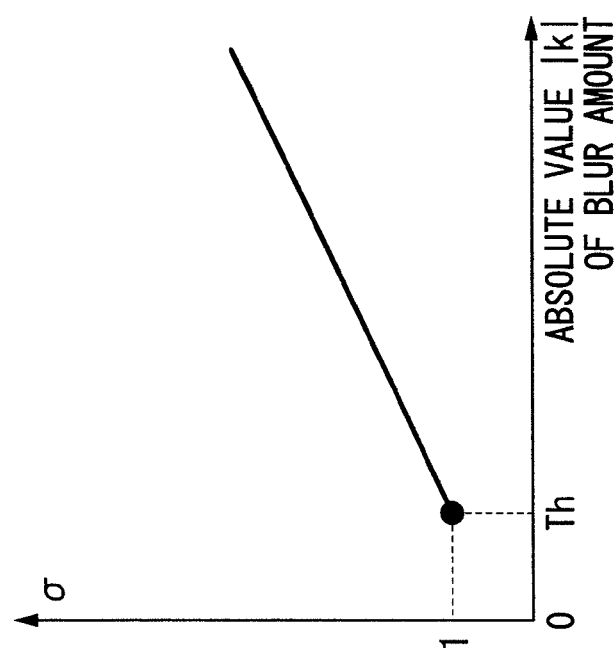
FIGS. 18A and 18B are graphs showing a relationship between the absolute value |k| of a blur amount and a σ parameter of a Gaussian filter.
Figure 18B:
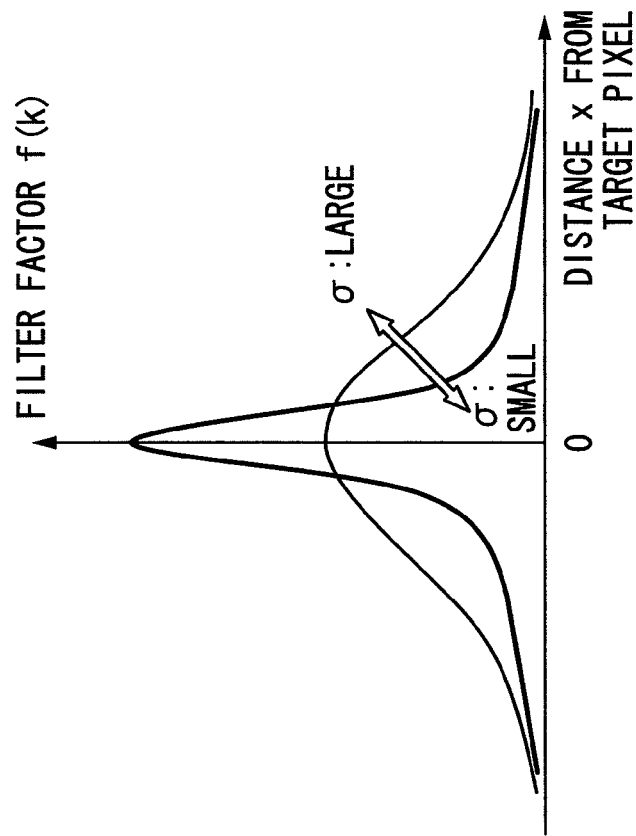

As described above, according to the present embodiment, Gaussian filters are used for the filtering process. FIGS. 18A and 18B are graphs showing a relationship between the absolute value |k| of the blur amount and a σ parameter of the Gaussian filter. As shown in FIG. 18, when the absolute value |k| of the blur amount is larger than the predetermined threshold Th, the σ parameter of the Gaussian filter proportional to the absolute value |k| of the blur amount is determined, and a Gaussian filter factor f(x) is determined according to the σ parameter. The CPU 24 determines the σ parameter based on the proportionality stored in the RAM area of the main memory 28.

FIG. 18B is a graph showing a relationship between a distance x from a target pixel and the filter factor f(x) of a Gaussian filter. As shown in FIG. 18B, with the Gaussian filter, a weighted average is taken by assigning larger weights to peripheral pixels with increases in the σ parameter. Thus, by increasing the σ parameter according to the absolute value |k| of the blur amount, it is possible to increase the extend of smoothing with increases in the absolute value |k| of the blur amount.

The filter factors f(x) are calculated from the σ parameter using Formula 2 and normalized such that their total sum will be 1.

$$f(x) = \frac{1}{\sigma\sqrt{2\pi}} \exp\left(-\frac{x^2}{2\sigma^2}\right) \qquad \text{[Formula 2]}$$

In the case of a digital filter, f(x) is determined for each discrete position around a target pixel. In the case of a five-tap filter, for example, f(x)={0.1, 0.2, 0.4, 0.2, 0.1}. Incidentally, to prevent image brightness from fluctuating, filter factors are generally normalized such that their total sum will be 1.0. Although one-dimensional filter factors are used here, by applying such filtering in the horizontal and vertical directions in turns, it is possible to perform two-dimensional filtering.

In this way, the filtering unit 40 filters the selected pixel according to the blur amount and thereby calculates an output pixel value (Step S145). The above steps are repeated for all the pixels. When it is determined that all the pixels have been processed (Step S66), the blurring process is finished. In this way, by filtering the reference image shot at the in-focus position B of the main subject, it is possible to emphasize the blur more naturally.

The filters used for the filtering is not limited to Gaussian filters, and any other low pass filter may be used. For example, a filter with a blur pattern according to the aperture or lens characteristics may be used.

When the blurring process is finished, the CPU 24 stores the output image of the filtering unit 40 in the recording medium 33 via the memory control unit 32 and finishes the blur-emphasizing shooting (Step S27).

In this way, a blur-emphasized image can be obtained.

The blurring process according to the present embodiment in FIGS. 16 and 17 may be applied to images without corresponding point detection and image transformation. That is, the image compositing process may be applied directly to the multiple images obtained by focus bracketing shooting.

What is claimed is:

1. An image pickup apparatus comprising:
   an automatic in-focus position determination device which determines an in-focus position of a main subject on the basis of image data;
   a focus bracket photography device which obtains a plurality of images by successively photographing images while discretely moving a focal position by a predetermined moving amount;
   a focal position control device which controls the focal position, so as to include the in-focus position of the main subject determined by the automatic in-focus position determination device and focal positions followed and preceded by the in-focus position;

a blur amount calculation device which calculates a blur amount according to pixel coordinates;

a blurring process device which performs blurring process on the basis of the calculated blur amount; and a recording device which records an image obtained by a predetermined image processing on a recording medium;

wherein the blur amount calculation device calculates a blur amount from the plurality of images photographed by the focus bracket photography device, including an image photographed at the in-focus position of the main subject and images photographed at the focal positions followed and preceded by the in-focus position of the main subject;

the blurring process device performs blurring process on one frame of a reference image selected from the plurality of images according to a predetermined criteria; and the recording device records the reference image which is blurring-processed by the blurring process device as the image obtained by the predetermined image processing; and wherein the blur amount calculation device calculates the blur amount, so as to make the blur amount larger with the increase of a difference between the focal position of an image having the highest sharpness and the focal position of the reference image.

2. The image pickup apparatus according to claim 1, wherein the focal position control device controls the focal position on the basis of at least one of an aperture and a focal distance at the time of photographing.

3. The image pickup apparatus according to claim 1, further comprising a sharpness calculating device which calculates sharpness of pixels at corresponding coordinates among the plurality of images, wherein the blur amount calculation device calculates the blur amount on the basis of the calculation result of the sharpness calculating device.

4. The image pickup apparatus according to claim 1, further comprising a blur emphasis degree setting device which sets a blur emphasis degree, wherein the blur amount calculation device calculates a blur amount according to the blur emphasis degree set by the blur emphasis degree setting device.

5. The image pickup apparatus according to claim 1, wherein the reference image is an image photographed at the in-focus position of the main subject.

6. The image pickup apparatus according to claim 1, wherein the blurring process device produces a smoothed image from the reference image using a lowpass filter which causes the blur amount to become larger as a cutoff frequency becomes lower.

7. The image pickup apparatus according to claim 1, further comprising:

a corresponding point detecting device which detects corresponding points on subjects among the plurality of images;

an image transformation device which transforms the plurality of images excluding a reference image so that positions of the corresponding points will coincide between the reference image and the plurality of images excluding the reference image using the image shot at the in-focus position of the main subject as the reference image; and a filtering device which determines a filter characteristics based on calculation results produced by the blur calculating device and applies digital filtering to the reference image shot at the in-focus position of the main subject, wherein the blur calculating device calculates the blur amounts in the plurality of images including the transformed images, and the recording device records an image obtained by the filtering device as the image obtained by the predetermined image processing.

8. An image pickup apparatus comprising:

an automatic in-focus position determination device which determines an in-focus position of a main subject on the basis of image data;

a focus bracket photography device which obtains a plurality of images by successively photographing images while discretely moving a focal position by a predetermined moving amount;

a focal position control device which controls the focal position, so as to include the in-focus position of the main subject determined by the automatic in-focus position determination device and focal positions followed and preceded by the in-focus position;

a blur amount calculation device which calculates a blur amount according to pixel coordinates;

a blurring process device which performs blurring process on the basis of the calculated blur amount; and a recording device which records an image obtained by a predetermined image processing on a recording medium; and further comprising:

a corresponding point detecting device which detects corresponding points on subjects among the plurality of images;

an image transformation device which transforms the plurality of images excluding a reference image so that positions of the corresponding points will coincide between the reference image and the plurality of images excluding the reference image using the image shot at the in-focus position of the main subject as the reference image; and a filtering device which determines a filter characteristics based on calculation results produced by the blur calculating device and applies digital filtering to the reference image shot at the in-focus position of the main subject, wherein the blur calculating device calculates the blur amounts in the plurality of images including the transformed images, the recording device records an image obtained by the filtering device as the image obtained by the predetermined image processing, and a sharpness calculating device which calculates sharpness of pixels at corresponding coordinates in the plurality of images, wherein the blur calculating device calculates the blur amounts in such a way as to increase the blur amounts with increasing difference in focus position between the sharpest image and the reference image.

9. The image pickup apparatus according to claim 8, wherein the blur amount calculation device calculates a blur amount from the plurality of images photographed by the focus bracket photography device, including an image photographed at the in-focus position of the main subject and images photographed at the focal positions followed and preceded by the in-focus position of the main subject;

the blurring process device performs blurring process on one frame of a reference image selected from the plurality of images according to a predetermined criteria; and the recording device records the reference image which is blurring-processed by the blurring process device as the image obtained by the predetermined image processing.

10. An image processing apparatus comprising:

an input device which inputs a plurality of images of an identical scene respectively photographed at different focal positions, including an image photographed at an in-focus position of a main subject and images photographed at focal positions followed and preceded by the in-focus position of the main subject;

a blur amount calculation device which calculates a blur amount according to pixel coordinates;

a blurring process device which performs blurring process on the basis of the calculated blur amount; and an output device which outputs an image obtained by a predetermined image processing, wherein:

the blur amount calculation device calculates a blur amount from the plurality of images, including an image photographed at the in-focus position of the main subject and images photographed at the focal positions followed and preceded by the in-focus position of the main subject;

the blurring process device performs blurring process on one frame of a reference image selected from the plurality of images according to a predetermined criteria; and the output device outputs the reference image which is blurring-processed by the blurring process device as the image obtained by the predetermined image processing, and the blur amount calculation device calculates the blur amount, so as to make the blur amount larger with the increase of a difference between the focal position of an image having the highest sharpness and the focal position of the reference image.

11. The image processing apparatus according to claim 10, further comprising:

a corresponding point detecting device which detects corresponding points on subjects among the plurality of images;

an image transformation device which transforms the plurality of images excluding a reference image so that positions of the corresponding points will coincide between the reference image and the plurality of images excluding the reference image using the image shot at the in-focus position of the main subject as the reference image; and a filtering device which determines a filter characteristics based on calculation results produced by the blur calculating device and applies digital filtering to the reference image shot at the in-focus position of the main subject, wherein the blur calculating device calculates the blur amounts in the plurality of images including the transformed images, and the output device outputs an image obtained by the filtering device as the image obtained by the predetermined image processing.

12. An image pickup method comprising:

an automatic in-focus position determination step of determining an in-focus position of a main subject on the basis of image data;

a focus bracket photography step of obtaining a plurality of images by successively photographing images while discretely moving a focal position by a predetermined moving amount;

a focal position control step of controlling the focal position, so as to include the in-focus position of the main subject determined by the automatic in-focus position determination step and focal positions followed and preceded by the in-focus position of the main subject;

a blur amount calculation step of calculating a blur amount according to pixel coordinates;

a blurring process step of performing blurring process on the basis of the calculated blur amount;

a recording step of recording an image obtained by a predetermined image processing on a recording medium, and the blur amount calculation step calculates a blur amount from the plurality of images photographed by the focus bracket photography step, including an image photographed at the in-focus position of the main subject and images photographed at the focal positions followed and preceded by the in-focus position of the main subject;

the blurring process step performs blurring process on one frame of a reference image selected from the plurality of images according to a predetermined criteria; and the recording step records the reference image which is blurring-processed by the blurring process step as the image obtained by the predetermined image processing, and wherein the blur amount calculation step calculates the blur amount, so as to make the blur amount larger with the increase of a difference between the focal position of an image having the highest sharpness and the focal position of the reference image.

13. The image pickup method according to claim 12, further comprising:

a corresponding point detecting step of detecting corresponding points on subjects among the plurality of images;

an image transformation step of transforming the plurality of images excluding a reference image so that positions of the corresponding points will coincide between the reference image and the plurality of images excluding the reference image using the image shot at the in-focus position of the main subject as the reference image; and a filtering step of determining a filter characteristics based on calculation results produced by the blur calculating step and applying digital filtering to the reference image shot at the in-focus position of the main subject, wherein in the blur calculating step, blur amounts are calculated in the plurality of images including the transformed images, and in the recording step, an image obtained by the filtering step is recorded on a recording medium as the image obtained by the predetermined image processing.

14. An image processing method comprising:

an automatic in-focus position determination step of determining an in-focus position of a main subject on the basis of image data;

a focus bracket photography step of obtaining a plurality of images by successively photographing images while discretely moving a focal position by a predetermined moving amount;

a focal position control step of controlling the focal position, so as to include the in-focus position of the main subject determined by the automatic in-focus position determination step and focal positions followed and preceded by the in-focus position of the main subject;

a blur amount calculation step of calculating a blur amount according to pixel coordinates;

a blurring process step of performing blurring process on the basis of the calculated blur amount;

a recording step of recording an image obtained by a predetermined image processing on a recording medium;

a corresponding point detecting step of detecting corresponding points on subjects among the plurality of images;

an image transformation step of transforming the plurality of images excluding a reference image so that positions of the corresponding points will coincide between the reference image and the plurality of images excluding the reference image using the image shot at the in-focus position of the main subject as the reference image; and a filtering step of determining a filter characteristics based on calculation results produced by the blur calculating step and applying digital filtering to the reference image shot at the in-focus position of the main subject, wherein in the blur calculating step, blur amounts are calculated in the plurality of images including the transformed images, and in the recording step, an image obtained by the filtering step is recorded on a recording medium as the image obtained by the predetermined image processing, and further comprising a sharpness calculating step which calculates sharpness of pixels at corresponding coordinates in the plurality of images, wherein the blur calculating step calculates the blur amounts in such a way as to increase the blur amounts with increasing difference in focus position between the sharpest image and the reference image.

15. The image processing method according to claim 14, wherein in the blur amount calculation step, a blur amount is calculated from the plurality of images photographed by the focus bracket photography step, including an image photographed at the in-focus position of the main subject and images photographed at the focal positions followed and preceded by the in-focus position of the main subject;

in the blurring process step, blurring process is performed on one frame of a reference image selected from the plurality of images according to a predetermined criteria; and in the recording step, the reference image which is blurring-processed in the blurring process step is output as the image obtained by the predetermined image processing.

\* \* \* \* \*